(12) United States Patent
Frank

(10) Patent No.: US 10,961,158 B2
(45) Date of Patent: Mar. 30, 2021

(54) MODIFIED INTERNAL BARRIER LAYER CAPACITOR MATERIAL AND METHOD OF FABRICATION

(71) Applicant: Blue Horizons Innovations, LLC, Coconut Creek, FL (US)

(72) Inventor: David L. Frank, Highland Beach, FL (US)

(73) Assignee: Blue Horizons Innovations, LLC, Coconut Creek, FL (US)

( * ) Notice: Subject to any disclaimer, the term of this patent is extended or adjusted under 35 U.S.C. 154(b) by 0 days.

(21) Appl. No.: 16/824,364

(22) Filed: Mar. 19, 2020

(65) Prior Publication Data

US 2020/0303121 A1 Sep. 24, 2020

Related U.S. Application Data

(60) Provisional application No. 62/820,971, filed on Mar. 20, 2019, provisional application No. 62/836,812, filed on Apr. 22, 2019, provisional application No. 62/859,739, filed on Jun. 11, 2019, provisional application No. 62/891,306, filed on Aug. 24, 2019, (Continued)

(51) Int. Cl.
| | |
|---|---|
| *C04B 35/465* | (2006.01) |
| *C04B 35/622* | (2006.01) |
| *H01G 4/12* | (2006.01) |
| *H01G 4/30* | (2006.01) |
| *H01G 4/008* | (2006.01) |
| *H01G 4/232* | (2006.01) |

(Continued)

(52) U.S. Cl.
CPC ........... *C04B 35/465* (2013.01); *C04B 35/622* (2013.01); *H01G 4/008* (2013.01); *H01G 4/1227* (2013.01); *H01G 4/30* (2013.01); *H01G 5/011* (2013.01); *H01G 5/013* (2013.01)

(58) Field of Classification Search
CPC .. C04B 35/465; C04B 35/622; H01G 4/1227; H01G 4/30
See application file for complete search history.

(56) References Cited

U.S. PATENT DOCUMENTS 3,416,207 A 12/1968 Maida
2009/0278211 A1* 11/2009 Kim .................. C23C 14/08
257/411

(Continued)

OTHER PUBLICATIONS

Kan et al. 'Battery Capacitor combinations in photovoltaic powered products' Journal of Power Sources 2006 pp. 1-9 entirety of document especially p. 1 para 1 2006.
(Continued)

*Primary Examiner* — Alex B Efta
(74) *Attorney, Agent, or Firm* — Jose Gutman; Fleit Intellectual Property Law

(57) ABSTRACT

A new composition of matter, and more specifically a new compound, includes two or more highly resistive materials integrated into the chemistry of the grain boundary of an internal barrier layer capacitor material. This new compound includes a high permittivity and high resistivity dielectric compound. This new compound has high permittivity, high resistivity, and low leakage current. In certain examples the new compound can be used to create a dielectric energy storage device that is a battery with very high energy density, high operating voltage per cell, and an extended battery life cycle.

8 Claims, 12 Drawing Sheets

Related U.S. Application Data provisional application No. 62/912,420, filed on Oct. 8, 2019, provisional application No. 62/916,308, filed on Oct. 17, 2019, provisional application No. 62/942,154, filed on Dec. 1, 2019, provisional application No. 62/958,799, filed on Jan. 9, 2020.

(51) Int. Cl.
*H01G 5/011* (2006.01)
*H01G 5/013* (2006.01)

(56) References Cited

U.S. PATENT DOCUMENTS

| | | | |
|---|---|---|---|
| 2014/0022694 A1* | 1/2014 | Reynolds | H01G 4/12 361/301.4 |
| 2017/0004929 A1* | 1/2017 | Frank | H01G 4/0085 |
| 2019/0009330 A1* | 1/2019 | King | H01G 4/1227 |
| 2019/0304708 A1* | 10/2019 | Turner | H01G 11/36 |
| 2021/0032166 A1* | 2/2021 | Zeng | C04B 35/462 |

OTHER PUBLICATIONS

Wikipedia 'Ceramic Capacitor' Nov. 18, 2016 (Nov. 18, 2016) retrieved from <https://en.wikipedia.org/w/index.php?title=Ceramic_capacitor&oldid=750236745> entirety of document especially p. 9 para 2 2016.

Wikipedia 'Sol-gel Process' Nov. 23, 2018 (Nov. 23, 2018) retrieved from <https://en.wikipedia.org/w/index.php?title=Sol%E2%80%93gel_process&oldid=870259298> entirety of document especially p. 3 para 5 2018.

Wikipedia 'Aluminum Oxide' Nov. 22, 2018 (Nov. 22, 2018) retrieved from <https://en.wikipedia.orgiwfindex.php?title.Aluminium_oxide&oldid=870135592> entirety of document especially p. 3 Table 1 2018.

Wikipedia 'Calcium Copper Titanate' Nov. 28, 2017 (Nov. 28, 2017) retrieved from <https://en.wikipedia.org/w/index.php?title=Calcium_copper_titanate&oldid=812515889> entirety of document especially p. 1 Table 1 2017.

PCT Notification of Transmittal of the International Search Report and the Written Opinion of the International Searching Authority dated Sep. 1, 2020.

Vander Wood, Tim B., Report of Results: MVA13345, TEM Characterization of Sintered Material, MVA Scientific Consultants, 9 Pages, Oct. 9, 2019.

* cited by examiner

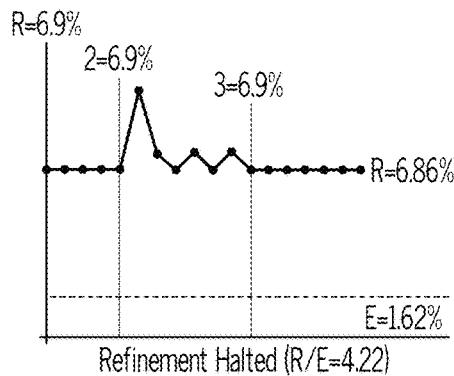

FIG. 11C

TCL10464

Scan ID: RX1-24005.ras · TCL10464
Scan Parameters: 2.0°/80.0°/0.04°/0.8(s), I(p)=31703/1972, Cu(40kV, 44mA), Wednesday, August 07, 2019, 10:11 AM

| ☑ Zero Offset = 0.3 (0.0032) | ☐ Displacement = 0.0 | ☐ Beam Spill-Off below 20.0° |
|---|---|---|
| ☑ Ka2 Peaks Present | ☐ Ka2/Ka1 Ratio = 0.5 | ☐ X-Ray Polarization = 1.0 |

Geometry: Diffractometer Lp    Fitted-Range: 22.0° - 80.0°    BG-Model: Fixed-Curve (22)    λ: 1.54059 A (Cu)
PSF: pseudo-Voigt    Broadening: Crystallite Size & Strain    Instrument: Constant FWHM = 0.1°

| Phase ID (8) | Chemical Formula | PDF-# | Wt% (ESD) | RIR | μ |
|---|---|---|---|---|---|
| Calcium Copper Titaniun Oxide (P... | $CaCu_3Ti_4O_{12}$ | 04-010-5727 | 42.7 (2.3) | 5.72 | 484.5 |
| CALCIUM TRICOPPER TETRATITA | $CaCu_3O_{12}Ti_4$ | 98-100-8180 | 24.2 (2.1) | 5.20 | 483.0 |
| Rutile (PO) | $TiO_2$ | 03-065-1119 | 8.6 (0.7) | 3.18 | 551.4 |
| Walstromite | $CaSiO_3$ | 98-001-3613 | 7.8 (1.1) | 0.73 | 237.0 |
| Corundum | $Al_2O_3$ | 04-013-1687 | 6.6 (1.8) | 0.95 | 124.1 |
| Tenorite | CuO | 00-048-1548 | 3.6 (0.4) | (1.0) | 289.2 |
| $CuAl_2O_4$ | $CuAl_2O_4$ | 98-001-5564 | 3.6 (0.4) | 3.73 | 169.9 |
| Silicone Oxide | fluorite (PO) | $SiO_2$ | 04-013-4688 | 2.8 (0.4) | 2.28 | 148.4 |

XRF(Wt%): CuO=3.12%, TiO=43.4%, CaO=9.9%, $SiO_2$=6.9%, $Al_2O_3$=8.6%

Refinement Halted (R/E=4.22), Round=3, Iter=12, P=42, R=6.86% (E=1.62%, EPS=0.5)

FIG. 11D

MODIFIED INTERNAL BARRIER LAYER CAPACITOR MATERIAL AND METHOD OF FABRICATION

BACKGROUND

The present disclosure generally relates to a new composition of matter and more specifically a new compound where two or more highly resistive materials are integrated into the chemistry of the grain boundary of an internal barrier capacitor resulting in a high permittivity, high resistivity dielectric compound with low leakage current and high breakdown voltage enabling a highly efficient energy storage dielectric material. The present disclosure also relates to methods of making the composition of matter and practical applications of the composition of matter.

Current battery and rechargeable battery technologies do not lend themselves to a broad range of applications. Large and heavy batteries are applied to electric vehicles and contribute a significant portion of the weight of the vehicle to enable driving range. Miniature batteries have been developed in recent years to address miniature sensors and actuators such as biomedical devices and wireless communication systems.

In the middle are requirements for portable electronic devices such as cellphones and computers. Chemical battery technologies have limited numbers of charge cycles before degradation of the battery charge capacity and are limited to 4 volts or less per cell.

Current capacitors have limited energy density and dissipate the stored charge quickly.

Many important applications demand high energy density, high operating voltage per cell, and an extended battery life-cycle. Capacitor materials with effective energy storage capabilities are needed.

Therefore a need exists to overcome the problems with the prior art as discussed above.

BRIEF SUMMARY

The present disclosure generally relates to a new composition of matter and more specifically a new compound where two or more highly resistive materials are integrated into the chemistry of the grain boundary of an internal barrier capacitor resulting in a high permittivity, high resistivity dielectric compound with low leakage current and high breakdown voltage enabling a highly efficient energy storage dielectric material.

For example, calcium copper titanium oxide (also known CCTO or calcium copper titanate) can be synthesized to create an internal barrier layer material with a permittivity of ~600,000. However, this internal barrier layer capacitor material has an internal resistivity of ~$10^1$ ohms/cm. The low internal resistivity does not allow much voltage to be applied across the CCTO to take advantage of the high permittivity (capacitance). Without a capability to apply strong voltage across CCTO, energy storage capability is greatly diminished.

In another example, Aluminum Oxide ($Al_2O_3$) is a highly resistive material with around $10^{14}$ ohms/cm but has a permittivity of around 6. Without a significant permittivity, energy storage capability is greatly diminished.

In another example, silicon dioxide ($SiO_2$) is a highly resistive material with around $10^{17}$ ohms/cm and a breakdown voltage of 15 Mv/cm but has a permittivity of around 9. Without a significant permittivity, energy storage capability is greatly diminished.

The inventor has made many attempts to dope CCTO with a resistive material or encase CCTO in an outer shell of insulator material. These include a core-shell configuration of CCTO core with an $Al_2O_3$ shell. The simple core shell configuration does increase resistivity but greatly reduces the permittivity to a level that does not support energy storage.

In one example embodiment of this invention, I add multiple resistive materials to the grain boundary of the internal barrier capacitor comprised of calcium copper titanium oxide ($CaCu_3Ti_{12}O_4$) known as CCTO. The resistive materials are added in a specific sequence to modify the chemistry of the CCTO outer grain boundary resulting in a unique grain boundary composition.

When certain resistive materials are added in the correct sequence and correct methods, the permittivity, resistivity and breakdown voltage can be optimized. I call this process Controlled Sequential Chemistry (CSC).

An optimized resistivity means that high energy storage can be obtained by creating high permittivity and low leakage current.

An optimized breakdown voltage means that high energy storage can be obtained by coupling the high breakdown voltage with high permittivity and low leakage current.

In addition, the resistive materials may be selected for integration into a highly resistive material that is positioned in between the grain boundaries. The resistive materials selected to modify the grain boundary composition can also be used to interconnect the resistive material that resides in between the grain boundaries. This results in the resistive material in between the grain boundaries becoming an extension of the grain boundaries.

I also describe where I create two phases of calcium copper titanium oxide (Calcium Copper Titanium Oxide: $CaCu_3Ti_4O_{12}$ and Calcium Tricopper Tetratita: $CaCu_3O_{12}Ti_{14}$). These two phases are identified as the primary phases present in the XRD analysis shown in FIGS. 11A to 11D.

The other phases identified in the XRD analysis of FIGS. 11A to 11D include rutile ($TiO_2$), walstromite ($CaSiO_3$), corundum ($Al_2O_3$), tenorite (CuO), copper aluminum oxide ($CuAl_2O_4$), and silicon oxide ($SiO_2$).

The two phase CCTO material offered effective integration with the added $Al_2O_3$ oxide and the $SiO_2$ matrix material. The capacitance of this novel compound was exceptionally high providing a permittivity of around 100,000 while maintaining the internal resistance and breakdown voltage expected from a 20% or higher $SiO_2$ matrix.

Below are listed various example embodiments of the invention. The list is numbered to organize reading of one or more of the list items.

1. According to various embodiments, an internal barrier layer capacitor material comprises: a base material having grain boundaries; first and second resistive materials bonded to the grain boundaries of the base material to form modified grain boundaries; and an amorphous region in between the modified grain boundaries, the amorphous region including at least one of the first and second resistive materials.

2. The internal barrier layer capacitor material described above in 1, wherein in certain embodiments the base material is a calcium copper titanium oxide.

3. The internal barrier layer capacitor material described above in 1 or 2, wherein the first resistive material is an aluminum oxide.

4. The internal barrier layer capacitor material of any one of the preceding numbered list items, wherein the second resistive material is a silicon oxide.

5. The internal barrier layer capacitor material of any one of the preceding numbered list items, wherein the base material includes first and second phases.

6. The internal barrier layer capacitor material described above in 5, wherein the first phase is calcium copper titanate and the second phase is calcium tri-copper tetratita.

7. The internal barrier layer capacitor material described above in 1, wherein the base material is calcium copper titanate (CCTO), the first resistive material is aluminum oxide, and the second resistive material is silicon dioxide.

8. The internal barrier layer capacitor material of any one of the preceding numbered list items, wherein the internal barrier layer capacitor material is in the form of particles less than 100 nm in diameter.

9. The internal barrier layer capacitor material described above in 8, wherein the particles are less than 10 nm in diameter.

10. The internal barrier layer capacitor material of any one of the preceding numbered list items, wherein the internal barrier layer capacitor material has:
a dielectric permittivity of at least 50,000;
a resistivity of at least $10^{12}$ ohms/centimeter; and
a dielectric strength of at least 50 volts per micron of thickness.

11. A Dielectric Energy Storage Material (DESM) comprises two or more of the internal barrier layer capacitor materials of any one of the preceding numbered list items 1-10.

12. The Dielectric Energy Storage Material described above in 11, wherein the two or more of the internal barrier layer capacitor materials are of different types.

13. The Dielectric Energy Storage Material described above in 11 or 12, wherein the two or more of the internal barrier layer capacitor materials are of different sizes.

14. A Dielectric Energy Storage Material (DESM) comprises a first modified internal barrier layer capacitor material described above in 1 surrounded by a second modified internal barrier layer capacitor material described above in 1 so that the DESM has a core shell configuration.

15. According to various embodiments, a multilayer ceramic capacitor comprises: at least one first electrode; at least one second electrode; and a plurality of internal barrier layer capacitor materials described above in 1, wherein the at least one first electrode and at least one second electrode are interleaved between the plurality of internal barrier layer capacitor materials.

16. The multilayer ceramic capacitor described above in 15, further comprising a coating and connecting terminals.

17. The multilayer ceramic capacitor described above in 15 or 16, wherein each of the plurality of internal barrier layer capacitor materials is less than one micron thick.

18. According to various embodiments, a system for storing energy comprises: an energy storage device including the internal barrier layer capacitor material described above in 1; and an energy generating device.

19. The system described above in 18, wherein the energy generating device is selected from a group including solar cells, radioisotope power cells, photovoltaic systems, thermal voltaic systems, movement charge systems, manual charge systems, and combinations thereof.

20. According to various embodiments, a method of making a modified internal barrier layer capacitor material, the method comprises: bonding a first resistive material to grain boundaries of an unmodified internal barrier layer capacitor material to form a grain boundary composition; and adding a second resistive material to the grain boundary composition to form the modified internal barrier layer capacitor material.

21. The method described above in 20, wherein the unmodified internal barrier capacitor base material is a calcium copper titanium oxide.

22. The method described above in 20 or 21, wherein the first resistive material is an aluminum oxide, preferably in an amount between 2% wt. and 15% wt.

23. The method described above in any one of 20-22, wherein the second resistive material is a silicon oxide, preferably in an amount between 10% wt. and 30% wt.

24. The method described above in any one of claims 20-23, wherein the unmodified internal barrier capacitor base material includes first and second phases.

25. The method described above in 24, wherein the first phase is calcium copper titanate and the second phase is calcium tri-copper tetratita.

26. The method described above in any one of 20-25, further comprising: synthesizing the unmodified internal barrier layer capacitor material using a sol-gel, solid state reaction, or wet sol-gel process.

27. The method described above in 20, wherein bonding the first resistive material to grain boundaries of the unmodified internal barrier capacitor material to form the grain boundary composition includes adding nanoparticles of the first resistive material to nanoparticles of the unmodified internal barrier layer capacitor material and heating.

28. The method described above in 20 or 27, wherein adding the second resistive material to the grain boundary composition to form the modified internal barrier layer capacitor material includes adding nanoparticles of the second resistive material to the modified internal barrier layer capacitor material and heating.

29. The method described above in 20, wherein the unmodified internal barrier layer capacitor material is calcium copper titanate (CCTO); the first resistive material is aluminum oxide ($Al_2O_3$) resulting in $CCTO/CuAl_2O_4$ as the grain boundary composition; and the second resistive material is silicon dioxide resulting in $CCTO/CuAl_2SiO_6$ as the modified internal barrier layer capacitor material.

30. The method described above in 29, wherein the unmodified internal barrier layer capacitor material is synthesized using a wet sol-gel process by mixing calcium, copper and titanate into a solution, forming a wet gel from the solution, and heating the wet gel to a temperature between 60° Celsius and 200° Celsius to produce nanoparticles of the unmodified internal barrier layer capacitor material.

31. The method described above in 29 or 30, wherein bonding the aluminum oxide to grain boundaries of the calcium copper titanate comprises adding nanoparticles of aluminum oxide preferably of between 2 nm and 50 nm diameter to the calcium copper titanate, and heating to form $CCTO/CuAl_2O_4$ as the grain boundary composition.

32. The method described above in 31, wherein heating is to a temperature between 700° C. to 900° C. for a time period between 2 to 20 hours.

33. The method described above in 31 or 32, wherein adding a second resistive material to the grain boundary composition to form the modified internal barrier layer capacitor material comprises adding nanoparticles of silicon dioxide preferably of between 2 nm and 50 nm diameter to the $CCTO/CuAl_2O_4$ and heating.

34. The method described above in 33, wherein the heating includes calcination to a temperature between 700° Celsius to 1,2000 Celsius for a time period between 1 hour to 20 hours followed by sintering to a temperature between 900° Celsius and 1200° Celsius for a time period between 2 to 20 hours to form CCTO/CuAl$_2$SiO$_6$ as the modified internal barrier layer capacitor material.

35. The method described above in any one of 20-34, wherein the modified internal barrier layer capacitor material is in the form of particles less than 100 nm in diameter.

36. The method described above in 35, wherein the particles are less than 10 nm in diameter.

37. The method described above in any one of 20-36, wherein the internal barrier layer capacitor material has: a dielectric permittivity of at least 50,000; a resistivity of at least $10^{12}$ ohms/centimeter; and a dielectric strength of at least 50 volts per micron of thickness.

38. According to various embodiments, a method of making a dielectric energy storage material, the method comprises: depositing the modified internal barrier layer capacitor material made according to the method described above in any one of 20-37 using inkjet printing, spray deposition, tape cast methods, screen printing, or spin coating.

39. The method described above in 38, wherein the dielectric energy storage material is formed into an ink or slurry that includes at least one dispersant selected from a group including nonionic surfactants, anionic surfactants, cationic surfactants, acrylic polymers, and random, block, and graft co-polymers thereof.

40. The method described above in 39, wherein the ink or slurry includes at least one solvent selected from a group including water, alcohol, ethanol, methanol, ethylene glycol, glycerol, tetradecane, toluene, and xylene.

41. The method described above in 40, wherein the ink or slurry includes at least one binder selected from a group including epoxy resins, acrylic resins, polyurethanes, polyester resins, UV activated polymers and polyvinyl.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIGS. 11A, 11B, 11C, and 11D: XRD Analysis of an Example Dual Phase CCTO-XS with Al$_2$O$_3$ and SiO$_2$ added.

DETAILED DESCRIPTION

Figure 1B:
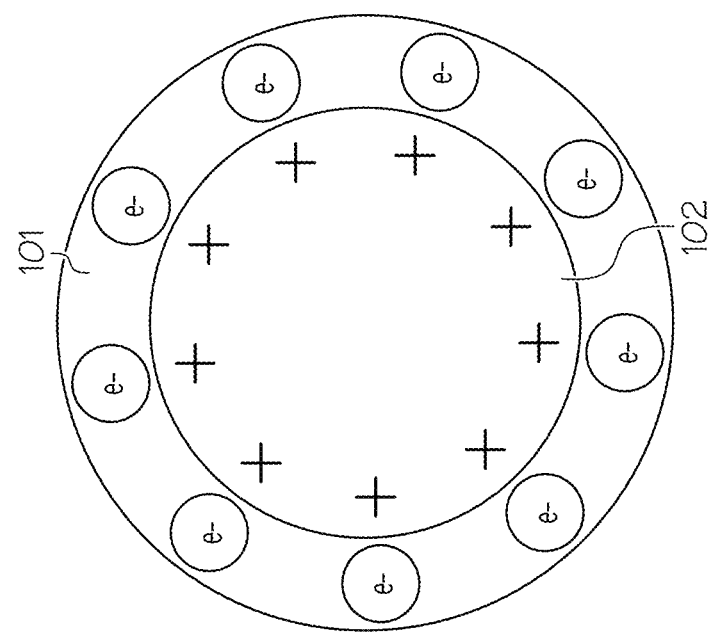
FIG. 1B: Example of An Internal Barrier Layer Capacitor (IBLC) Material.

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any proprietary detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising i.e., open language. The term "coupled," as used herein, is defined as "connected," although not necessarily directly, and not necessarily mechanically.

The present disclosure generally relates to a new composition of matter and more specifically a new compound where two or more highly resistive materials are integrated into the chemistry of the grain boundary of an internal barrier capacitor resulting in a high permittivity, high resistivity dielectric compound with low leakage current and high breakdown voltage enabling a highly efficient energy storage dielectric material.

In one example, a new compound that is formed by a sequential addition of two or more highly resistive materials that increase the barrier layer resistivity of an internal barrier capacitor and therefore increase the ability to apply a strong voltage across an internal barrier layer capacitor. I have added multiple resistive materials to calcium copper titanium oxide (CCTO) in a specific sequence to modify the chemistry of the CCTO outer grain boundary. When certain resistive materials are added in the correct sequence and correct methods, the permittivity, resistivity and breakdown voltage can be optimized.

I call this process Controlled Sequential Chemistry (CSC).

An optimized resistivity means that high energy storage can be obtained by creating high permittivity, high breakdown voltage and low leakage current.

The following is one example of a sequential synthesis of a new material with optimized permittivity and resistivity:

First, Calcium, Copper and Titanate are combined to form CCTO nanoparticles of average size of less than 100 nm diameter. The grains of CCTO each represent an internal barrier layer capacitor. CCTO nanoparticles can be synthesized by a variety of well-known methods such as sol-gel processing.

Between 2% wt. and 15% wt Aluminum Oxide nanoparticles of between 2 nm and 50 nm diameter are added to the CCTO nanoparticles and calcined at temperatures between 700° C. to 900° C. for a time period between 2 to 20 hours to form CCTO/Cu $Al_2O_4$ in the grain boundary forming the first modified grain boundary composition.

Between 10% wt. and 30% wt. Silica nanoparticles of between 2 nm and 50 nm diameter preferably in the form of Tetraethyl Orthosilicate (TEOS) are then added to the first modified grain boundary composition and calcined/sintered 700° C. to 1,200° C. for a period of 1 hour to 20 hours forming Ca, Cu, Ti, Al, Si, O. TEOS is the chemical compound with the formula $Si(OC_2H_5)_4$.

Various stoichiometric values can be applied to the formula for Calcium Copper Titanium Oxide $Ca_jCu_kTi_lO_m$, where j, k, l, and m are within the range of 0 to 20.

The Ca, Cu, Ti, Cu, Al, Si, O compound is sintered at temperatures between 900° C. and 1200° C. for a time period of between 2 to 20 hours to form Ca, Cu, Ti, Al, Si, O where alumina and silica are attached to the Ca and Cu within the grain boundary of CCTO.

The Alumina and Silica that are attached and integrated into the CCTO grain boundary result in a highly resistive grain boundary. $Al_2O_3$ has a resistivity of ~$10^{14}$ ohms/cm and Silica dioxide has a very high resistivity of ~$10^{17}$ ohms/cm and a breakdown voltage of 15 Mv/cm.

Because the high resistivity materials, namely $Al_2O_3$ and $SiO_2$ are now an integral part of the CCTO chemistry, they are not separate dielectric materials and do not work as dielectric materials in series. They work as one internal barrier layer capacitor.

I add more $SiO_2$ than can be absorbed by the grain boundary to form an amorphous $SiO_2$ material in between the grain boundaries of the modified CCTO. The $SiO_2$ in the grain boundary and the amorphous $SiO_2$ material have direct connections, extending the grain boundary into the amorphous $SiO_2$ material.

The permittivity of the Ca, Cu, Ti, Al, Si, O can exceed 100,000 depending on CCTO chemistry purity and heat treatment temperature and time. The resistivity can exceed one tera-ohm and the break-down voltage can exceed 1,000 v with the modified chemistry and interconnection between the grain boundary and the amorphous $SiO_2$ material in the inter-grain region.

Combining different sized Ca, Cu, Ti, Al, Si, O grains in the mixture can increase overall permittivity in the mixture. CCTO grains can be processed separately to create larger grains with high permittivity to be mixed with smaller grains with higher resistivity.

The multimodal grain size can be applied in various combinations of grain sizes and core shell configurations.

Figure 1A:
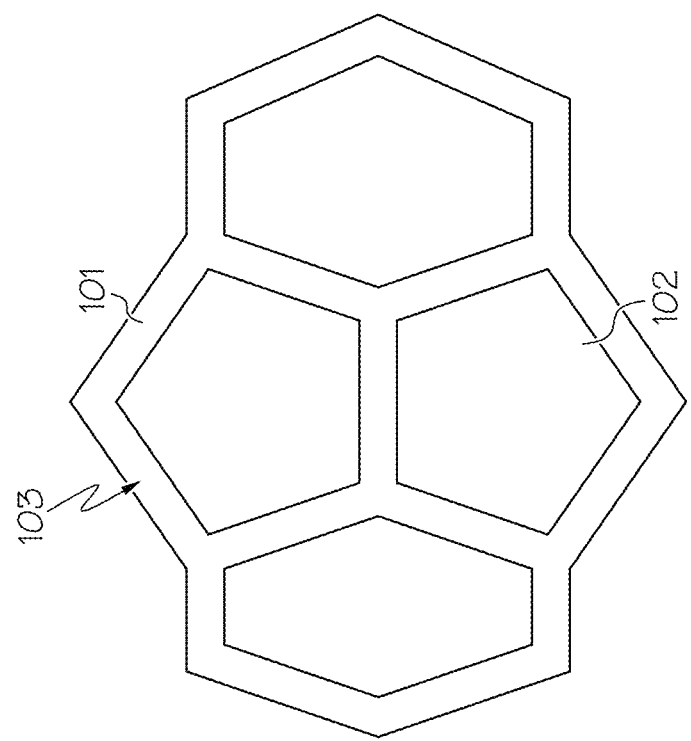
FIG. 1A: Example of a Single Grain of an Internal Barrier Layer Capacitor (IBLC) Material.

FIGS. 1A and 1B illustrate CCTO as a barrier layer capacitor material (IBLC). The semi-conductor grain (102) of this perovskite IBLC material has a lower resistance than the grain boundary (101). An inter-grain region (103) is located in between the grains (102) where material can be applied to form a core shell configuration.

The addition of $Al_2O_3$ to CCTO creates a material with the formula CCTO/$CuAl_2O_4$. When heat treated (calcined or sintered), a portion of the $Al_2O_3$ combines with a portion of the Cu to form $CuAl_2O_4$ in the grain boundary increasing resistivity in the grain boundary and raising both the permittivity and resistivity of CCTO.

The rise in resistivity is on the order of 100× times the initial CCTO resistivity. The rise in the permittivity is on the order of 10× or greater. The $Al_2O_3$ at the grain boundary also inhibits grain growth in CCTO. The CCTO grain boundary resistivity increase is on the order of 100×.

Each of these additional materials affect the CCTO in different ways:

$Al_2O_3$ combines with Cu and migrates to the grain boundary forming $CuAl_2O_4$ $Al_2O_3$ inhibits CCTO grain growth $SiO_2$ combines with the $CuAl_2O_4$ at the grain boundary and forms $CuAl_2SiO_6$ The sintered compound results in Ca, Cu, Ti, Cu, Al, Si, O This new compound is called a Dielectric Energy Storage Material (DESM).

When this new compound is created as an ultra-fine particle (less than 20 nm) I call this internal barrier layer capacitor material a "Dielectrum". The Dielectrum is a small (less than 20 nm) insulator particle with an internal barrier layer capacitor configuration. The Dielectrum provides unique characteristics when applied in a matrix. For example, when applied as an equally distributed suspension in $SiO_2$, the Dielectrum provides increased resistivity, increased breakdown voltage and increased permittivity when compared to other types of dielectric materials suspended in the same matrix.

DESM stages of fabrication when using the calcium copper titanium oxide internal barrier layer capacitor with multiple oxides applied to create the modified internal barrier capacitor material suspended in a matrix:

CCTO: An unmodified calcium copper titanate as an internal barrier layer capacitor material. The disclosure contemplates titanium oxides other than titanate.

CCTO-X: A modified calcium copper titanium oxide as an internal barrier layer capacitor material. One example modification is $Al_2O_3$ added to the internal barrier layer capacitor material.

CCTO-XS: A modified calcium copper titanium oxide as an internal barrier layer capacitor material with two resistive oxides applied and the second resistive oxide providing a matrix to suspend the CCTO-XS particles.

"Dielectrum": The Dielectrum is a small (less than 20 nm) insulator particle with an internal barrier layer capacitor configuration. The Dielectrum provides unique characteristics when applied in a matrix.

Excess $SiO_2$ forms an amorphous glass layer in-between the grain boundaries. Excess $Al_2O_3$ may also be incorporated into this glass layer. The $SiO_2$ connected to the CCTO grain boundary extends into the $SiO_2$ glass layer interconnecting the glass layer with the CCTO grain boundary. This glass layer in between the CCTO grain boundaries is highly resistive estimated at above $10^{15}$ ohms/cm and with a breakdown voltage of 15 Mv/cm.

Multilayer Thin Film and Fabrication of a Dielectric Energy Storage Element

The Dielectric Energy Storage Material CCTO-XS can be applied as the dielectric material in a multilayer ceramic capacitor (MLCC) design. To fabricate the MLCC using the Dielectric Energy Storage Material I first fabricate an MLCC multilayer thin film.

Creation of a dielectric slurry

Creating a thin film sheet by tape casting the dielectric slurry on a carrier film Drying the dielectric slurry to form a dielectric sheet known as a dielectric energy storage layer Screen printing electrodes onto the dielectric sheet De-reeling the dielectric sheet from the carrier film Building a multilayer stack of dielectric sheets Cutting the multilayer stack of dielectric sheets in multiple directions Forming individual dielectric multilayer stacks (dielectric energy storage layer)
Bake out of the dielectric multilayer stacks
Firing of the dielectric multilayer stacks
Edge rounding the multilayer stacks
Applying the first external electrodes to the inner electrodes of the multilayer stack in preparation for the outer layer electrode.

The Dielectric Energy Storage Material (DESM) may be bifurcated to increase resistivity. A highly resistive material is spray deposited onto the tape casted dielectric sheet forming a layer less than 1 micron thick, where a second dielectric sheet forms the top of the dielectric energy storage layer resulting in a bifurcated dielectric energy storage layer.

Firing the Multilayer Stack

In one example, the Dense Energy Ultra-Cell (DEUC) multilayer thin film is sintered at a temperature between 950° Celsius to 12000 Celsius for between 4 to 20 hours.

In one example, the electrode layers within the DEUC multilayer thin film are comprised of nickel. The nickel can be applied by various deposition methods including but not limited to spray, inkjet and screen print deposition.

In one example, I use nitrogen to create a reduced oxygen atmosphere. The oven chamber air is evacuated either completely or partially and replaced with nitrogen gas. The nitrogen gas provides a reduced oxygen atmosphere in the oven chamber.

In one example, oxygen is introduced during the cooling phase after the material is sintered. In another example, the material is re-heat treated in a reduced oxygen atmosphere to further reduce oxidation of the nickel electrodes.

When I sinter the DEUC multilayer thin film in a nitrogen environment, the silicon dioxide applied to the CCTO-XS nanoparticles merges with both the CCTO-XS grain boundary components and the nitrogen atmosphere to become CCTO-XS.

In one example of CCTO-XS, $Al_2O_3$ is added to the calcined CCTO material forming $CuAl_2O_4$ on the grain boundary.

In one example, $SiO_2$ merges with $CuAl_2O_4$, on the CCTO-XS grain boundary, to form $Al_3Cu_3(SiO_4)_3$. $SiO_2$ also combines with calcium in the grain boundary to form $CaSiO_3$.

The integration of Si into the CCTO-XS grain boundary at these multiple sites extends the CCTO-XS grain boundary into the $SiO_2$ and $Si_2ON_2$ matrix.

The integration of Si into the CCTO-XS grain boundary combined with an $SiO_2$ and $Si_2ON_2$ matrix creates an enhanced resistivity and raised breakdown voltage for CCTO-XS.

With the nitrogen atmosphere, some portion of the $SiO_2$ merges with nitrogen to possibly form $Si_2ON_2$. There would likely always be oxygen in any compound here, so at the very least, it might be $Si_2ON_2$.

The $Si_2ON_2$ and $SiO_2$ may be a combination of amorphous and crystalline phases.

Figure 2:
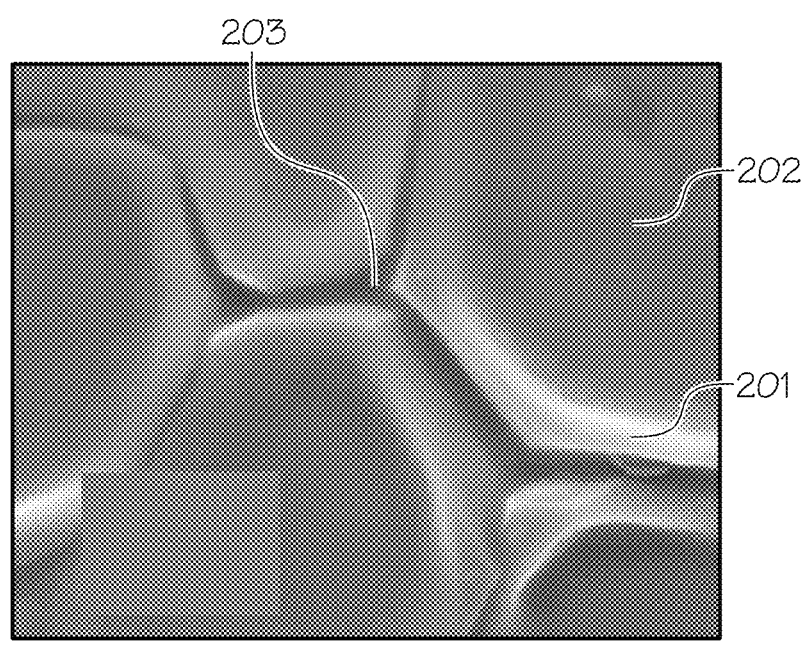
FIG. 2: Example IBLC Inter-grain Boundary Region.

FIG. 2 illustrates an example of multiple IBLC grains (202), the grain boundary (201) and the inter-grain region (203). The highly resistive materials are applied to the grain boundary forming a grain boundary compound. The highly resistive materials also fill the inter-grain regions (203). The grain boundary (201) compound is interconnected to the resistive material in the inter grain region (203).

This provides a highly resistive grain boundary (201) for increased IBLC permittivity, high internal resistivity for low leakage current, and high breakdown voltage.

When highly resistive materials are combined with an internal barrier layer capacitor they typically form multiple layers of materials resulting in a series capacitor configuration, greatly diminishing the permittivity of the internal barrier layer capacitor.

In a series capacitor configuration, the permittivity of two dielectric materials is based on the formula below where d is the depth and e is the permittivity.

$$\frac{d}{\varepsilon_r} = \frac{d1}{\varepsilon 1} + \frac{d2}{\varepsilon 2}$$

Internal barrier layer capacitors include perovskite materials. The added materials to the perovskite dielectric material are derived from compounds found in alkali metals, alkali earth metals, transition metals, rare earths, semi-metals and other metals as found on the Periodic Table.

In the IBLC model, CCTO ceramics consist of n-type semiconducting grains and insulating grain boundaries. The formation of highly resistant barrier layers at the grain boundaries during the sintering process is the origin of the large dielectric constant of CCTO.

The perovskite oxides ($ABO_3$) lose some oxygen during the sintering process at elevated temperatures.

Oxygen depletion at higher temperatures leaves the material with excess electrons making the material n-type semiconductor. Re-oxidation takes place during cooling, during which oxygen tries to enter the material through grain boundaries. As the temperature drops, slower diffusivity of oxygen at low temperature leaves the material with only partial re-oxidation.

As a result, re-oxidation happens in the grain boundaries and grain interior will remain oxygen depleted. These re-oxidized grain boundary regions act as barrier layer due to their insulating nature, whereas grain interiors still remain conducting due to excess electrons.

As a result, in FIGS. 1A and 1B I illustrate the formation of grain N-Type semiconductor and a grain boundary (101) with an insulator grain boundary (102) with higher resistivity, and showing inter-grain region (103), to complete the IBLC model and provide high permittivity.

The formation of barrier layer contributes to high value of dielectric constant of the CCTO.

Figure 3:
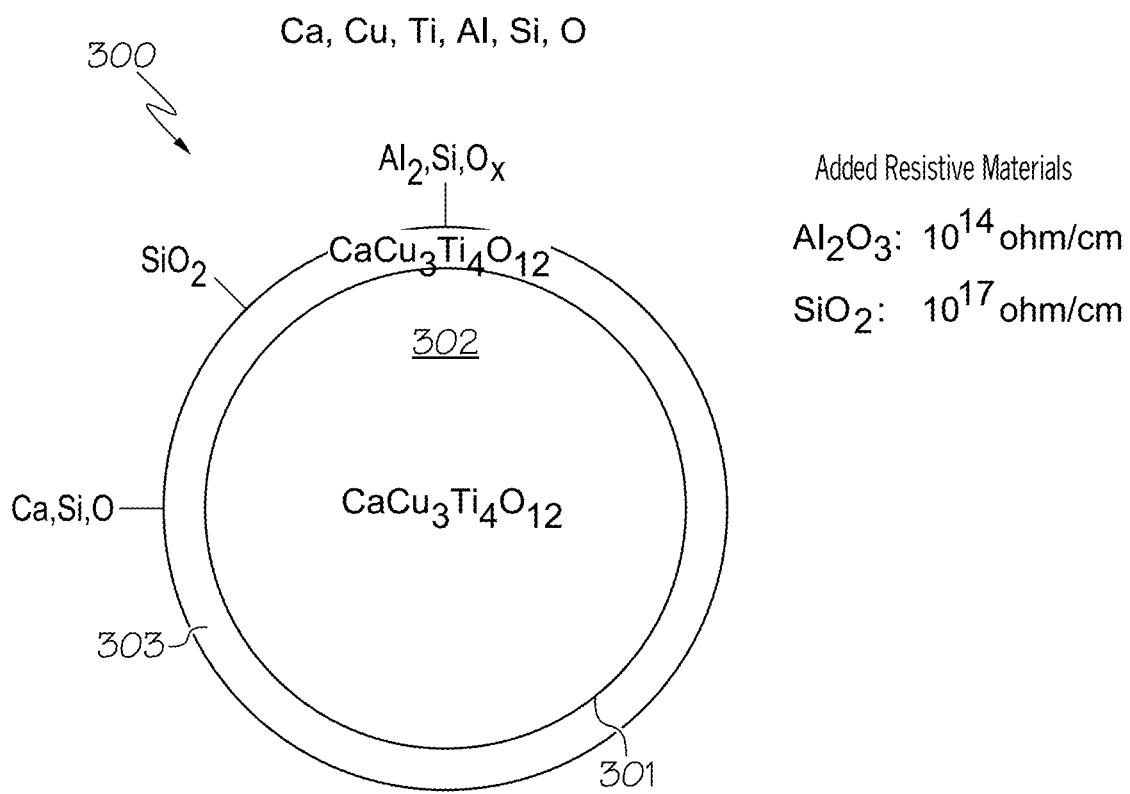
FIG. 3: Example IBLC: Ca, Cu, Ti, Cu, Al, Si, O.

In FIG. 3, I illustrate an example internal barrier layer capacitor (IBLC) material with a novel chemistry (This example uses Calcium Copper Titanium Oxide (CCTO) as the IBLC material (300). The grain boundary (301) is modified to be comprised of Ca $Cu_3Ti_4Al_s$ Si $O_{17}$. The grain (302) remains CCTO. This adds increased resistivity to the grain boundary (301). This modification results in a highly resistive grain boundary (301) for increased IBLC permittivity, high internal resistivity for low leakage current and high breakdown voltage.

In one example, a wet sol-gel process is used to create the CCTO base material of the internal barrier layer capacitor. Calcium, copper and titanium oxides are mixed in a solution and heated to between 60 and 100 degrees Celsius resulting in a wet gel.

The wet gel is heated to 130 degrees Celsius resulting in an exothermal reaction and combustion, without the addition of acid, resulting in a barrier layer capacitor material of ultra-fine nanoparticles of less than 20 nm in diameter.

Figures 4A, 4B, 4C:
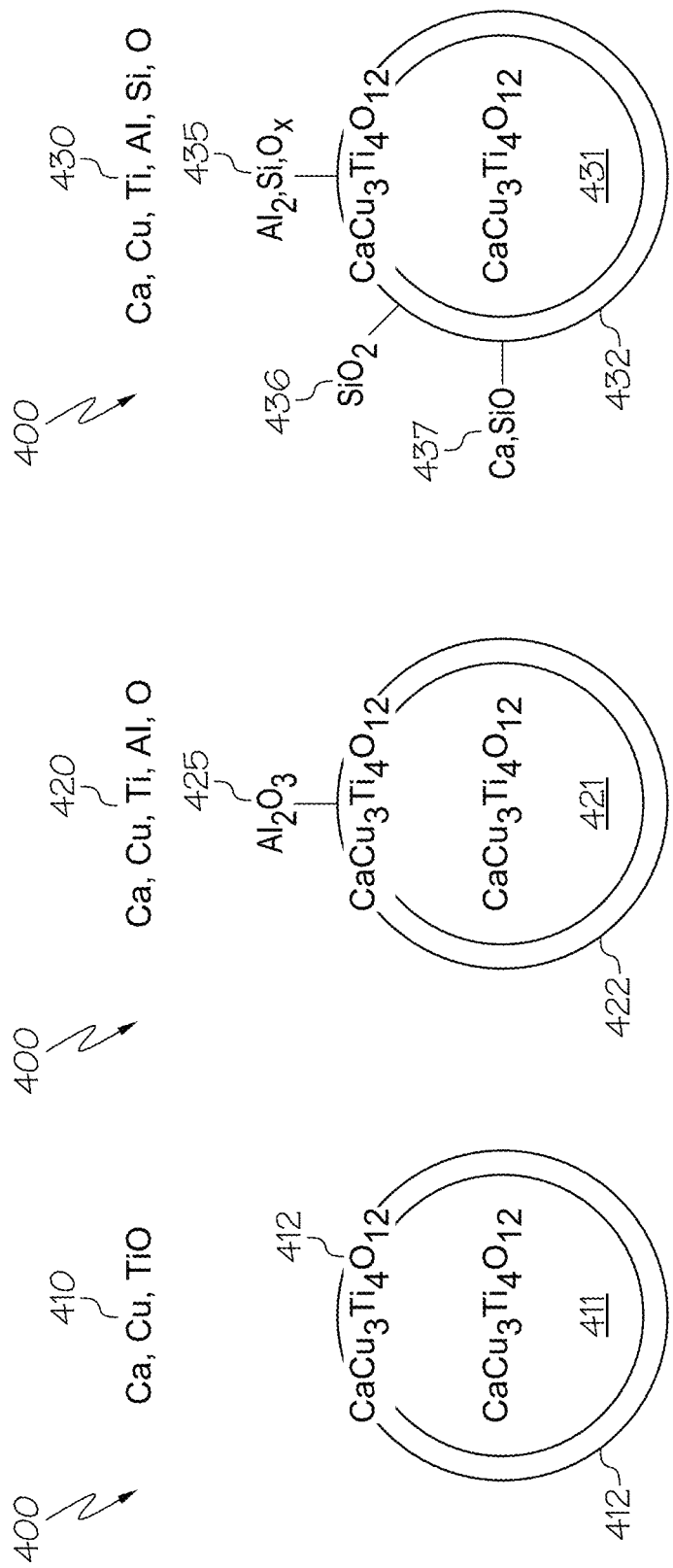
FIGS. 4A, 4B, and 4C: Example Process Steps for Synthesizing Ca, Cu, Ti, Cu, Al, Si, O.

In FIGS. 4A to 4C, I illustrate an example of a controlled sequential chemistry (CSC) (400) process to modify the grain boundary CCTO (412, 422, 432). In the following description of FIGS. 4A to 4C, unless specifically mentioned, the disclosure contemplates a variety of stoichiometries.

The first material is the base CCTO comprised of $CaCu_3Ti_4O_{12}$ in both the grain (411) and the grain boundary (412).

The second material is a CaCuTiSiAlO where the grain (421) is comprised of CCTO and the grain boundary (422) is comprised of a CaCuTiSiAlO (420) compound.

The third material is CaCuTiASiO where grain (431) is comprised of CCTO and the grain boundary (432) is comprised of a CaCuTiASiO compound (430).

In the third step, according to the example, where $SiO_2$ is added, I add excess $SiO_2$ beyond the amount that would be absorbed into the grain boundary. This excess $SiO_2$ migrates into the inter-grain region (203) and forms an amorphous $SiO_2$, a glassy material. The inter-grain region (203) is shown in FIG. 2 and the inter-grain region (303) is shown in FIG. 3.

In the example, the $SiO_2$ addition to the grain boundary and the formation of the amorphous $SiO_2$ are formed concurrently. The $SiO_2$ in the grain boundary interconnects to the amorphous $SiO_2$ in the inter-grain region.

The $SiO_2$ in the inter-grain region provides the largest breakdown voltage associated with the CCTO grains. The amorphous $SiO_2$ can provide a breakdown voltage of up to 1,500 volts per micron.

The interconnection of the $SiO_2$ in the grain boundary and the amorphous $SiO_2$ apply an integrated resistivity to the grain boundary and enable high permittivity of greater than 50,000.

Figure 5:
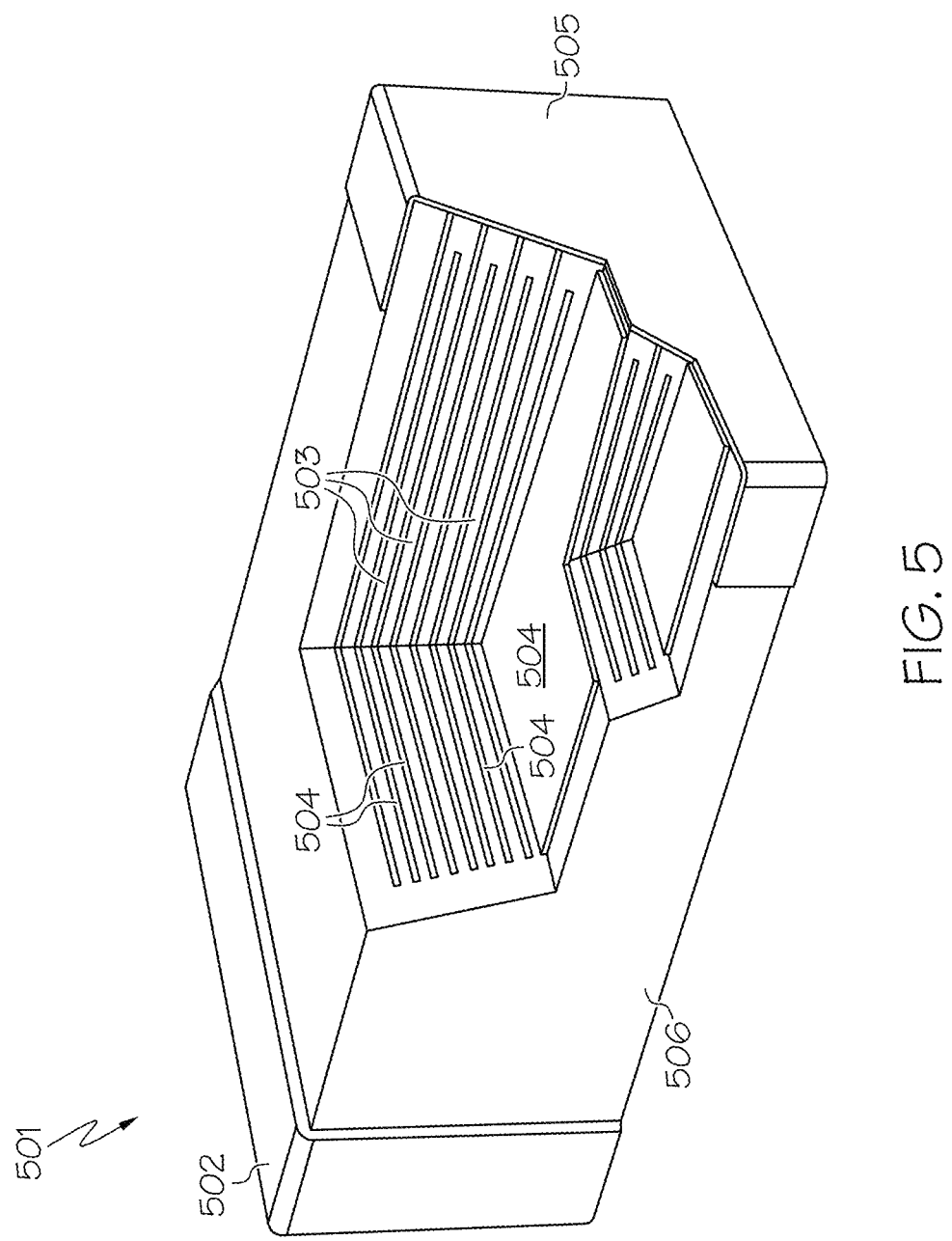
FIG. 5: Example Cross Section of Multilayer Ceramic Capacitor (MLCC).

In FIG. 5, I illustrate an example cross section of a multilayer ceramic capacitor (MLCC) (501) where the dielectric layers (503) are comprised of my new dielectric compound as discussed herein. The electrode layers (504) are interleaved in between the dielectric layers (503). In some cases, a coating is applied to the outside of the MLCC (506) with the connecting terminals (502, 505) exposed for electrical connection. When the new dielectric material described herein is applied in an MLCC configuration it forms an energy storage device known as a Dense Energy Ultra-Cell (DEUC).

The disclosure contemplates different suitable materials for electrodes (504). Base metal electrodes can be used to reduce cost. These include but are not limited to nickel, copper and a combination of nickel and copper bi-metal powders. Copper electrodes should be limited to lower sintering temperatures to 1050° Celsius and below. Nickel electrodes should be used in a reduced atmosphere to inhibit oxidation during the sintering process to temperatures above 1,000° Celsius. The lifetime of the DEUC electrodes may be improved by using copper rather than nickel internal electrodes. In addition, current and voltage characteristics have demonstrated that the leakage current in a high dc electric field is suppressed when using copper internal electrodes.

Base metals are identified as any nonferrous metals that are neither precious metals nor noble metals. The most common base metals are copper, lead, nickel, tin, aluminum, and zinc. Base metals are more common and more readily extracted than precious metals, which include gold, silver, platinum, and palladium. Noble metals, some of which also are precious, are unlike base metals because they resist oxidation. Some common examples of noble metals include silver, gold, osmium, iridium, and rhodium.

Base metals, precious metals and noble metals may be used to fabricate the DEUC electrodes (504).

DEUC Electrode Collectors, according to various embodiments, can be fabricated in a same manner as a multilayer ceramic capacitor (MLCC) Terminal and serve the same function as the MLCC Terminal. For example, the two opposing ends of the fired DEUC Multilayer Thin Films represent the left and right electrodes. In FIG. 5 these are indicated by terminal (502) (e.g., the left collector) and terminal (505) (the right collector). The left and right electrodes (504) at each end can be coated with a metal paste that becomes the DEUC Electrode Collector (otherwise known as a Terminal). The metal paste interconnects all of the left electrodes (504) to the left collector (502) and separately all of the right electrodes (504) to the right collector (505). The collector/terminals (502, 505), provide the two (positive and negative) electrical connections (502, 505) of the DEUC. The left electrodes (504) and separately the right electrodes (504) are interleaved with each other in a stack of layers. The dielectric energy storage material layers (503) are also interleaved with the electrodes (504) in the stack of layers.

As an illustrative example, and not for limitation, a stack of layers in a DEUC might include: a left electrode layer (504), a dielectric energy storage material layer (503), a right electrode layer (504), a dielectric energy storage material layer (503), etc. The sequence of interleaved layers may be repeated building up the stack of layers in the DEUC. All of the left electrodes (504) are interconnected to the left collector (Terminal) (502) and separately all of the right electrodes (504) are interconnected to the right collector (Terminal) (505). Different sequences of electrode layers, dielectric energy storage material layers, and interconnections of certain electrode layers to a left collector (Terminal) or to a right collector (Terminal) are anticipated by the present disclosure which is presented herein only for illustrating an example.

If nickel is used for the internal electrodes (504), according various embodiments, a copper paste can be applied, according to various embodiments, and the chips are baked to a temperature of around 800 degrees Celsius. Other types of electrode and collector conductive materials are anticipated by the present disclosure which is presented herein only for illustrating an example.

The initial internal barrier layer capacitor material can be synthesized using a variety of methods including but not limited to:

Sol-Gel

The term sol-gel refers to a process in which solid nanoparticles dispersed in a liquid (a sol) agglomerate together to form a continuous three-dimensional network extending throughout the liquid (a gel). The gel is dried and calcined to form the compound. The term sol-gel is sometimes used as a noun to refer to gels made through the sol-gel process.

Wet Sol-Gel

The term wet sol-gel refers to the proprietary process presented herein where chemical solutions of a material are dispersed in a liquid (a sol) and agglomerate together to form a continuous three-dimensional network extending throughout the liquid. The liquid is allowed to form a wet gel. The wet gel is heated resulting in an internal combustion of the solvents and wet gel chemistry to form an ash state. The ash is ground-down, and the ground material is calcined to form the compound.

Flame Spray Pyrolysis

Spray pyrolysis method is based on forming an aerosol from various precursor solutions, which could be a solution of metallic salts or a colloidal solution. The generated solution droplets (aerosol) are then very rapidly heated in a furnace at given temperature, thus passing through several stages: (1) evaporation of the solvent from the surface of the droplets, (2) drying the droplets containing the precipitated solute, (3) the annealing of the precipitate at high temperatures (thermolysis), (4) formation of microporous particles of defined phase composition, (5) formation of solid particles, and (6) sintering of solid particles. Because the particles obtained after thermolysis are very reactive, inner ("in situ") sintering is needed. In the spray pyrolysis procedure, preparation of uniform and fine droplets of reactants and their controlled thermal decomposition are demanding operations.

Solid State Reaction

The solid-state reaction route is the most widely used method for the preparation of polycrystalline solids from a mixture of solid starting materials. Solids do not react together at room temperature over normal time scales and it is necessary to heat them to much higher temperatures, often to 1000 to 1500° C. in order for the reaction to occur at an appreciable rate.

The above disclosure generally relates to the configuration of perovskite dielectric materials to enable high permittivity, high resistivity, low leakage current, high breakdown voltage resulting in energy storage materials and is not limited to the perovskite material CCTO nor are the added materials limited to $Al_2O_3$, Strontium and Silicon Oxide. A perovskite is any material with the same type of crystal structure as calcium titanium oxide ($CaTiO_3$).

The above applications do not represent the limits of the CCTO-XS where CCTO-X is a modified stoichiometry of CCTO and where X represents the addition of a first set of oxides and S represents the addition of a second set of oxides and the matrix material.

Example Deposition Methods for the New Compound

Deposition methods for the new compound material, described herein, include inkjet printing, spray deposition, tape cast methods, screen print, spin coat and any other conventional deposition process. This is a non-exhaustive list and other deposition methods are also anticipated by the present disclosure.

Grain Growth

In the modified internal barrier capacitor (IBLC) material, the IBLC grain growth is inhibited by the addition of $Al_2O_3$ forming $CuAl_2O_4$ in the grain boundary depleting some of the copper in the grain boundary and the formation of an $SiO_2$ shell prior to sintering. The $SiO_2$ shell isolates the IBLC grains restricting interfacial contact between the grains. Therefore, the ability of the grains to come in contact with each other and merge (grain growth) is greatly reduced. The result is an even particle distribution within the $SiO_2$ matrix. The $SiO_2$ is integrated with the IBLC grain boundary. This means that the IBLC grains retain their grain size as created during calcination and densify without grain growth. It also means that the overall permittivity is based on an integrated IBLC and $SiO_2$ material and retains the high permittivity of the IBLC.

Thin Film Formation

The IBLC material, according to various embodiments, can be designed to a specific grain size between 5 nm to 1,000 nm during calcination. This grain size is maintained during sintering based on the particle isolation created with an oxide material such as an $Al_2O_3$ addition to the grain boundary prior to forming an $SiO_2$ shell around each particle in preparation for sintering. These example methods allow for thin films of a variety of thicknesses and particle count.

Thin films are formed by depositing the new compound material to the desired thickness and thin film dimensions. When depositing the new compound in a multilayer thin film where the new compound is restricted in thickness by the opposing layers, grain growth is restricted in the film height dimension. In some cases, grain growth is anisotropic. This is where the grains merge and grow in an elongated fashion away from the restricted path.

Example Devices and Fabrication Methods Using the New Compound

Example devices using the new compound, described herein, include electronic components, multilayer ceramic capacitors (MLCC), energy storage devices and any other device that could utilize an energy storage ceramic material. The MLCC energy storage device is called the Dense Energy Ultra-Cell (DEUC).

Example fabrication methods of devices using the new compound, described herein, include inkjet printing, spray deposition, tape cast methods, spray tape cast methods, screen print, spin coat and any other fabrication method used to deposit nanoparticle material.

For a nano ink for inkjet and/or spray deposition system, the modified internal barrier layer capacitor material, a dispersant may be applied. Example dispersants include one or more members of the following group: nonionic surfactants, anionic surfactants, cationic surfactants, acrylic polymers, and random, block, and graft co-polymers. Other types of dispersants are also anticipated in the present disclosure.

For a slurry to be used in tape cast methods, according to various embodiments, one or more solvents selected from a group including water, alcohol, ethanol, methanol, ethylene glycol, glycerol, tetradecane, toluene, and xylene, and one or more binders selected from a group including epoxy resins, acrylic resins, polyurethanes, polyester resins, UV activated polymers and polyvinyl, are applied to a modified internal barrier layer capacitor material.

The new compound can be applied in a multilayer ceramic capacitor configuration where the new compound is interleaved in between electrodes forming an energy storage element.

The energy storage elements can be connected to form energy storage cells. Multiple energy storage cells can be connected together to form energy storage modules and/or energy storage arrays.

In a combined application, at least one energy store device using the new material is coupled with at least one of: one or more solar cells, one or more radioisotope power cells, a photovoltaic system, a thermal voltaic system, a movement charge system, and a manual charge system, for providing electric charge to the energy storage material. This list is only to illustrate examples, and other combined applications using the new material are anticipated in the present disclosure.

In various alternative embodiments, at least one device utilizing the energy storage material is designed and fabricated to power at least one of micro devices, integrated circuits, electric vehicles, unmanned aerial vehicles, electronic cigarettes, mobile computing devices, laptops, tablets, mobile phones, wireless communication devices, mobile sensor systems. This list is only to illustrate examples.

In further various alternative embodiments, at least one device utilizing the energy storage material is designed and fabricated suitable for use as electric power grid support or to provide uninterruptible power supplies.

Figure 6:
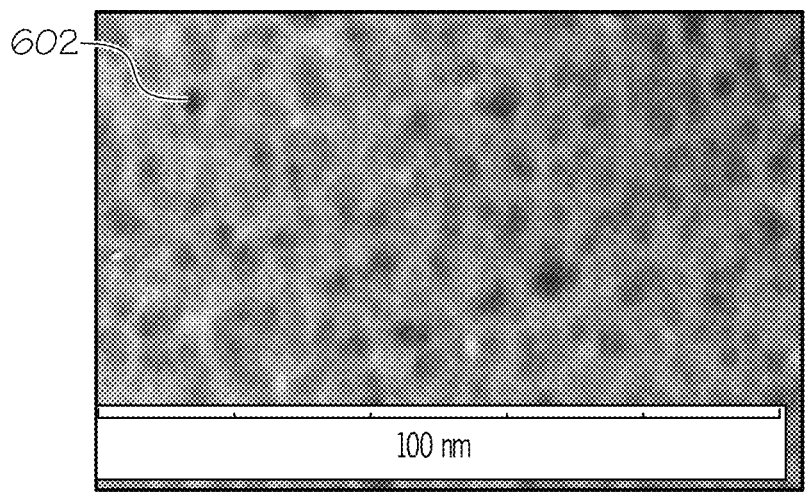
FIG. 6: Transmission Electron Microscopy (TEM) Analysis of Example Calcined CCTO Showing Particle Size, Matrix and Grain Growth Control.

In FIG. 6, I show a Transmission Electron Microscopy (TEM) image of the modified internal barrier layer capacitor (IBLC) grains suspended in a matrix forming the Dielectric Energy Storage Material. The IBLC grains are shown as particles (602) of around 5 nm with good distribution throughout the matrix. The CCTO-XS particles were calcined at 850 degrees Celsius for 8 hours and DESM was sintered at around 1100 degrees Celsius for at least 6 hours.

The CCTO grains would normally merge into grain growth forming grains of around 250 microns from this sintering process. The modified internal barrier capacitor material remains as small grains derived from the calcination process while being densified in the sintering process. The reason for the small grain size is the separation of the grains by the matrix material, in this example, silicon dioxide. If the particles do not have interfacial contact, they cannot merge. The calcined particle size is maintained throughout the sintering process, except for densification. The calcined particle composition is modified by the $SiO_2$ addition but remains relatively the same as far as calcined CCTO composition as the particles are isolated in the $SiO_2$ matrix.

FIG. 6 is a TEM analysis that shows that the CCTO-XS particle size calcined at 850° C. for 4 hours maintains 5 nm in diameter after sintering in the matrix.

Figure 7:
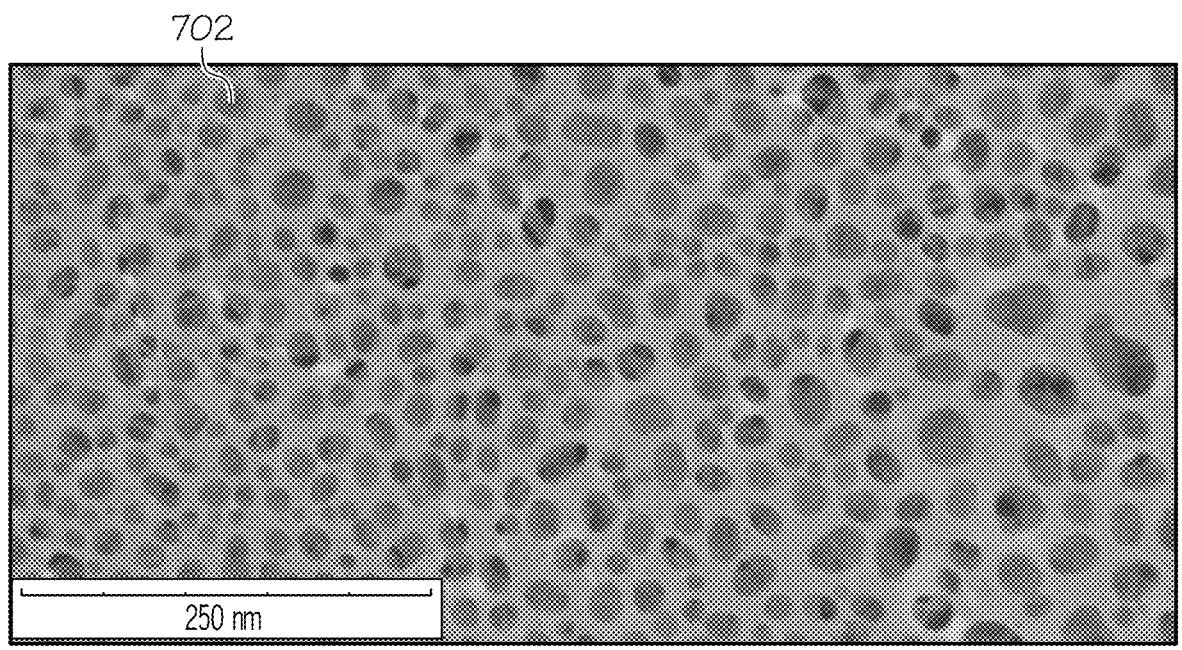
FIG. 7: TEM Analysis of Example Calcined CCTO Showing Particle Size based on being calcined at 950 Celsius for 8 hours.

FIG. 7 is a TEM analysis that shows that when calcine temperature is raised at 950° C. for 8 hours the particle size (element 702) is raised to ~25 nm in diameter.

Figure 8A:
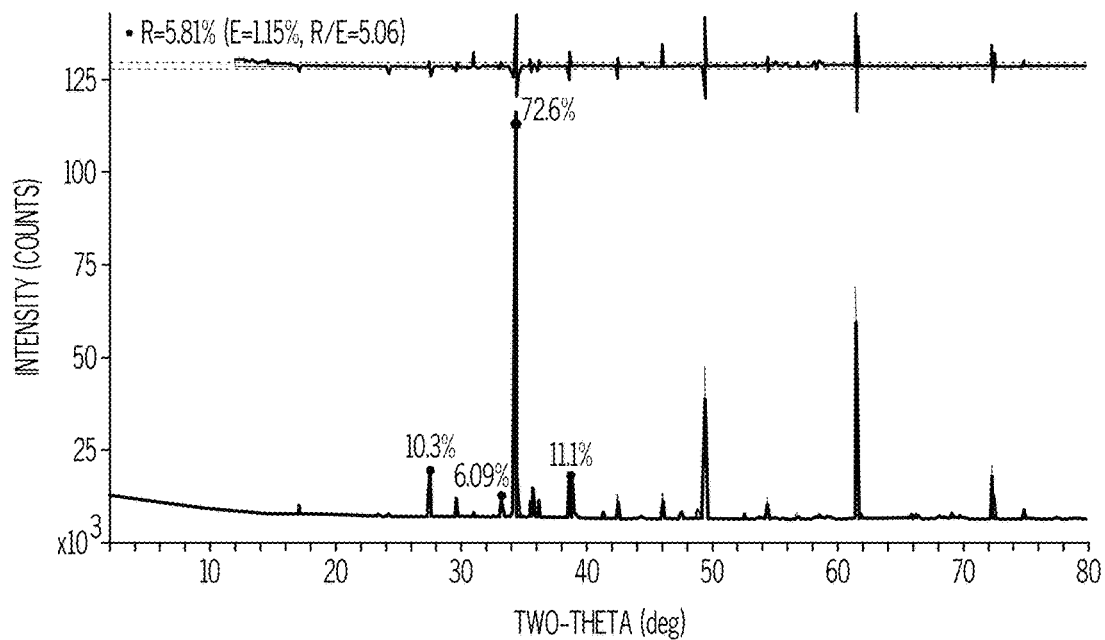
FIGS. 8A, 8B, and 8C: X-Ray Diffraction (XRD) Analysis of Example Calcined CCTO based on being calcined at 900 Celsius for 8 hours.
Figure 8B:
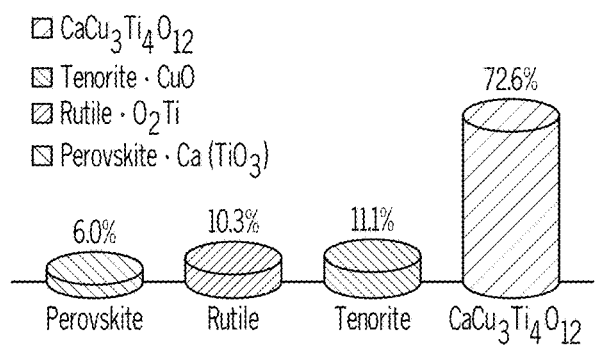
Figure 8C:
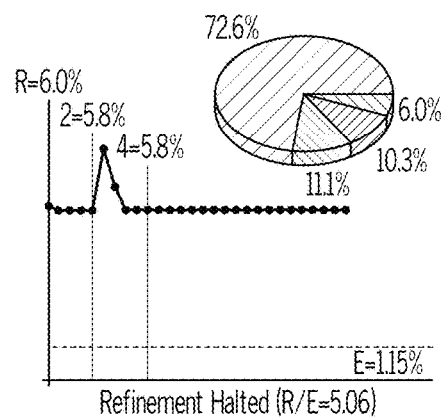

In FIGS. 8A, 8B, and 8C, I show an X-Ray Diffraction (XRD) analysis of the CCTO-XS material calcined at 850° C. for 8 hours. Note that the CCTO-XS purity is shown as 72.6%.

Figure 9A:
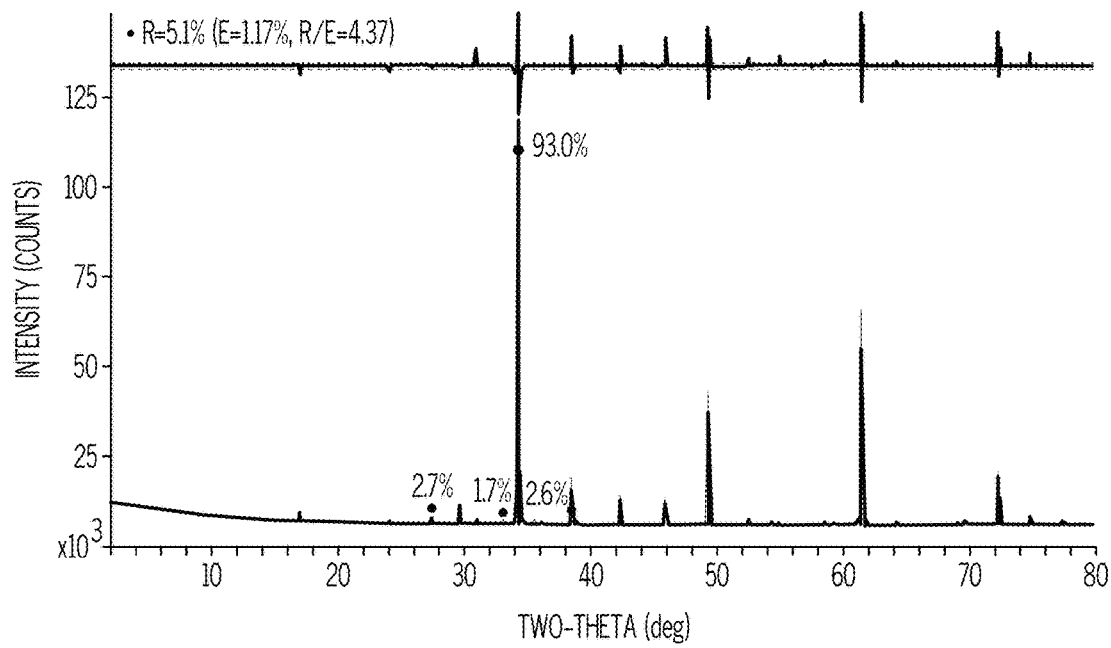
FIGS. 9A, 9B, and 9C: XRD Analysis of Example Calcined CCTO based on being calcined at 950 Celsius for 8 hours.
Figure 9B:
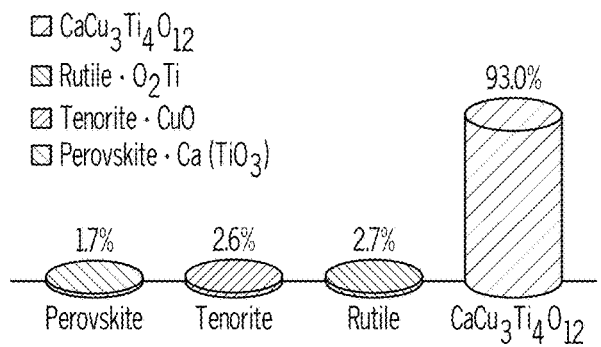
Figure 9C:
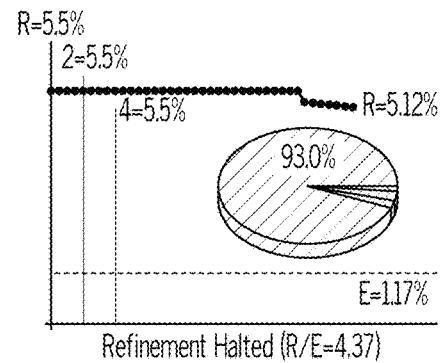

Raising the temperature or extending the heat treatment time can raise the purity to ~99%. An example is shown in FIGS. 9A, 9B, and 9C, where the temperature is raised at 950° C. for 8 hours and the purity moves to 93%.

Figures 10A, 10B:
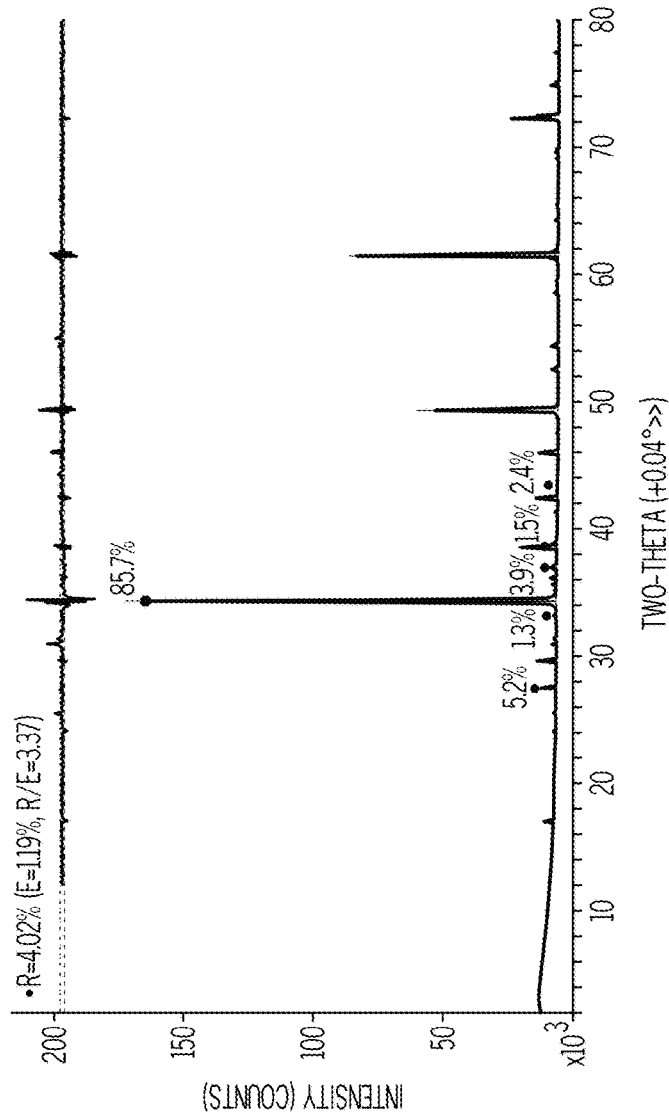
FIGS. 10A and 10B: XRD Analysis of Example Calcined CCTO based on being calcined at 900 Celcius for 8 hours with First Oxide Added.
Figure 11A:
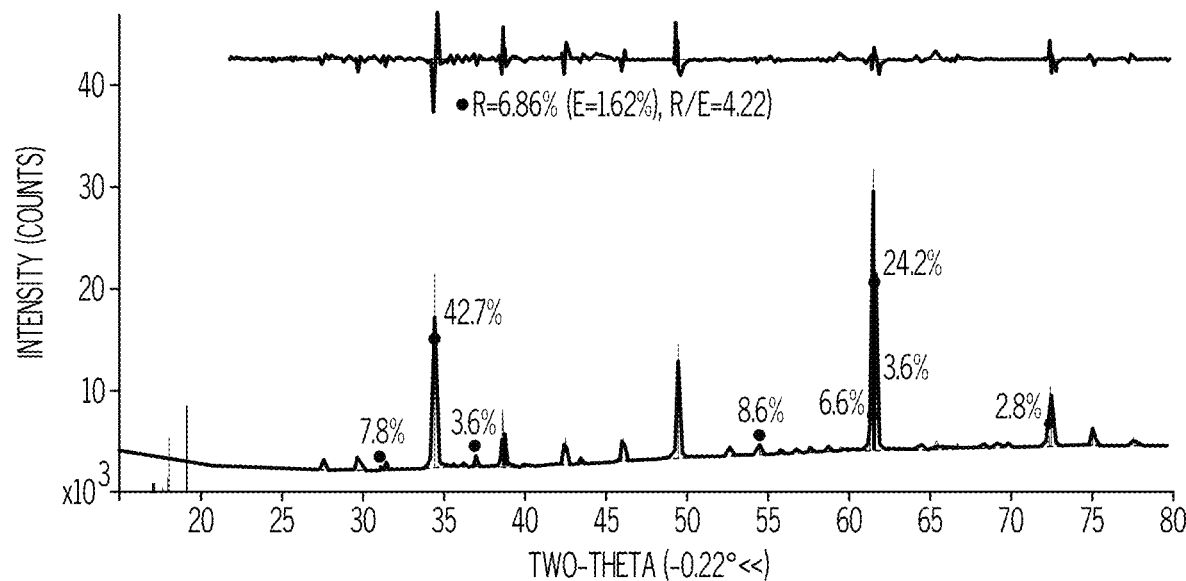
Figure 11B:
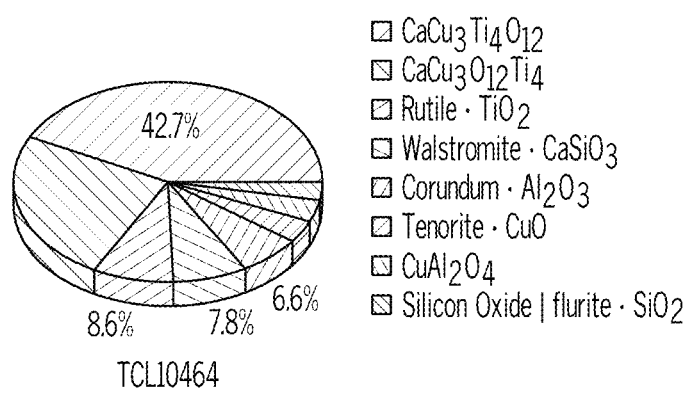
Figure 12A:
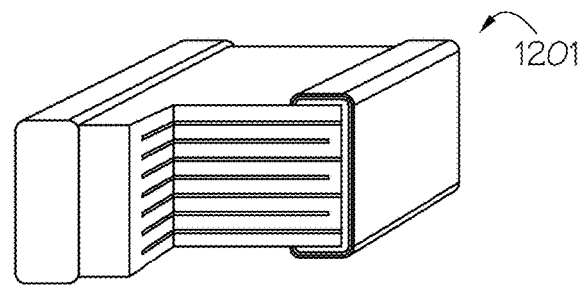
FIGS. 12A, 12B, 12C, 12D, and 12E: Examples of DEUC Modules.
Figure 12B:
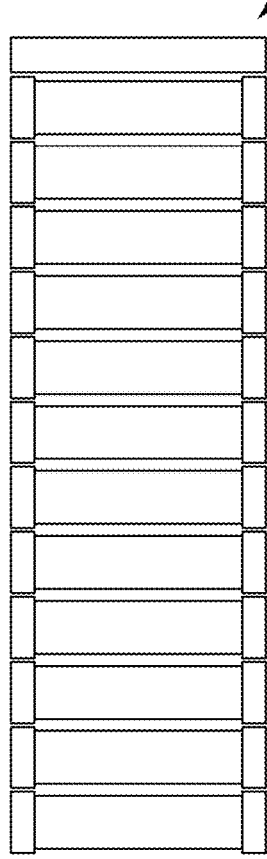
Figure 12C:
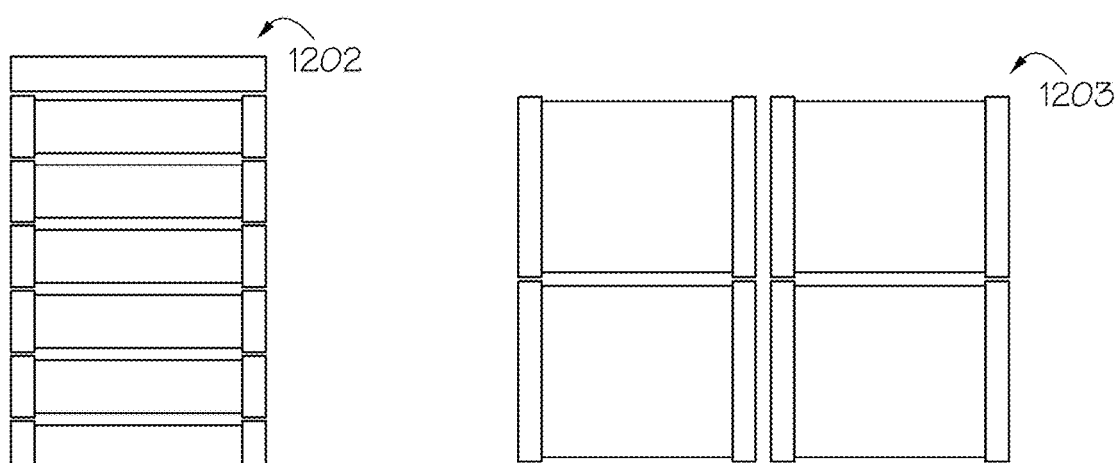
Figure 12D:
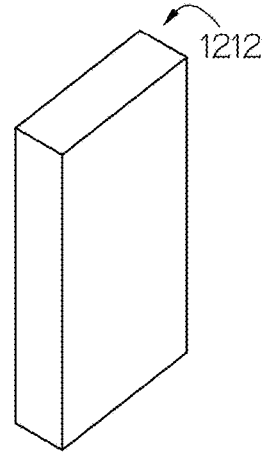
Figure 12E:
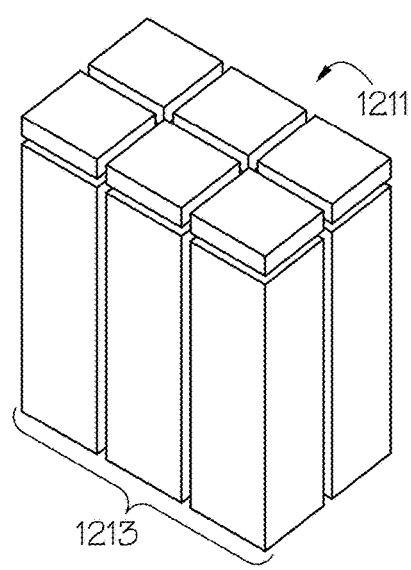

In FIGS. 10A and 10B, I show an example X-Ray Diffraction analysis of CCTO-XS with a second calcination with $Al_2O_3$ forming $CuAl_2O_4$ on the grain boundary. Other secondary phases such as $TiO_2$, CaO and $CaTiO_3$ can be adjusted, reduced or eliminated by altering the stochiometric formula, changing the calcination temperature, and/or changing the calcination time.

FIGS. 11A, 11B, 11C, and 11D, show an XRD analysis of CCTO-X calcined at 850° C. for 4 hours then re-calcined with $Al_2O_3$ and then sintered with $SiO_2$ added. This resulted in a dual phase CCTO-X with the primary peak ~34 degrees and the secondary peak ~62 degrees. These two peaks are dominant in CCTO formation. However the peak at 34 degrees shows only 42.7% cubic CCTO structure and a 42.7% cubic formation is significantly less than the single phase CCTO shown in FIG. 10. These two peaks are shown as (Calcium Copper Titanium Oxide: $CaCu_3Ti_4O_{12}$ and Calcium Tricopper Tetratita: $CaCu_3O_{12}Ti_{14}$) in the XRD analysis report of FIGS. 11A, 11B, 11C, and 11D.

Together, these two phases comprise about 69% by volume of the sample. The other phases identified for this sample were rutile ($TiO_2$), walstromite ($CaSiO_3$), corundum ($Al_2O_3$), tenorite (CuO), copper aluminum oxide ($CuAl_2O_4$), and silicon oxide ($SiO_2$) at levels of 8.6%, 7.8%, 6.6%, 3.6%, 3.6%, and 2.8% w/w, respectively. The database patterns identified for this sample appear to describe all peaks in the measured data.

The powder sample has approximately 20% or more silicon dioxide content. The powder was prepared for XRD analysis in a low background Si holder using light manual pressure to keep the sample surfaces flat and level with the reference surface of the sample holder. The XRD filtering for Si based on the Si holder provided a lower Si content in the XRD output.

The two phase CCTO-XS material offered effective integration with the added $Al_2O_3$ oxide and the $SiO_2$ matrix material. The capacitance of this novel compound was exceptionally high providing a permittivity of around 100,000 while maintaining the internal resistance and breakdown voltage expected from a 20% or higher $SiO_2$ matrix. For approximately 20% wt. of silica which is around 30% volume as silica is much lighter than the CCTO-X, I would expect the resistivity to be ~$10^1$ ohms for a 10-micron thick CCTO-XS layer. Resistivity can range, according to various embodiments, between $10^8$ to $10^{14th}$ ohms.

DEUC Elements (1201) (as shown in FIGS. 12A to 12E), according to various embodiments, can be combined in various arrangements/configurations and used as building blocks to create the following example Dense Energy Ultra Cell energy storage devices.

A DEUC Stack (1202) can include one or more DEUC elements (1201) stacked together and interconnected in series and/or parallel circuit(s) to form a DEUC Stack (1202).

A DEUC Cell (1203) can include one or more DEUC Stacks (1202) interconnected in series and/or parallel circuit(s) to form a DEUC Cell (1203).

A DEUC Module (1212) can include one or more DEUC Cells (1203) combined together and interconnected in series and/or parallel circuit(s) to form a DEUC Module (1212).

A DEUC Module Array (1213) can include one or more DEUC Modules (1212) combined and which may be interconnected in series and/or parallel circuit(s) to form a DEUC Module Array (1213).

As shown in the example of FIGS. 12A to 12E, according to various embodiments, a Dense Energy Ultra Cell can be comprised of stacked DEUC Elements (1201) interconnected to form one or more DEUC Stacks (1202). One or more DEUC Stacks (1202) can be interconnected to form a DEUC Cell (1203). DEUC Elements (1201), whether stacked or otherwise, are the building blocks of the DEUC Cell (1203). A DEUC Cell (1203) is therefore comprised of DEUC Elements (1201). One or more DEUC Cells (1203) can be interconnected to form a DEUC Module (1212). One or more DEUC Modules (1212) can be interconnected to form a DEUC Module Array (1213).

Optionally, energy management sensor modules (1211) and/or DEUC voltage control modules (1211) may be placed to collect information from a single DEUC Element (1201), a DEUC Stack (1202), a DEUC Cell (1203), a DEUC Module (1212) or two or more DEUC Modules that are combined to form a DEUC Module Array (1213). Voltage converters and voltage regulators (1211) may be applied to a DEUC Element (1201), a DEUC Stack (1202), a DEUC Cell (1203), a DEUC Module (1212), or an array of DEUC Modules (1213), to maintain a consistent voltage input to, and output from, respectively thereto.

The features and advantages described in the specification are not all inclusive, and particularly, many additional features and advantages will be apparent to one of ordinary skill in the art in view of the description, specification and claims hereof.

Moreover, it should be noted that the language used in the specification has been principally selected for readability and instructional purposes, and may not have been selected to delineate or circumscribe the inventive subject matter, resort to the claims being necessary to determine such inventive subject matter. Although specific embodiments of the subject matter have been disclosed, those having ordinary skill in the art will understand that changes can be made to the specific embodiments without departing from the scope of the disclosed subject matter. The scope of the disclosure is not to be restricted, therefore, to the specific embodiments, and it is intended that the appended claims cover any and all such applications, modifications, and embodiments within the scope of the present disclosure.

Summary of Various Non-Limiting Example Embodiments

One example, according to various embodiments of the present invention, includes a modified internal barrier layer capacitor material comprising:
an unmodified internal barrier layer capacitor material as a base;
a first resistive material bonded to grain boundaries of the unmodified internal barrier layer capacitor material thereby resulting in a grain boundary composition; and
a second resistive material bonded to the grain boundary composition thereby resulting in the modified internal barrier layer capacitor material; and
the second resistive material being applied as a suspension resulting in the modified internal barrier layer capacitor grain boundary being suspended in a resistive matrix; and
where the modified internal barrier layer capacitor grain boundary materials and the resistive matrix result in an integrated grain boundary region.

When applied in the matrix, the above modified internal barrier layer capacitor materials are isolated from one another in the matrix. This enables particle sizes of less than 500 nm, less than 100 nm, less than 50 nm, or less than 10 nm, depending on the chemistry and calcination temperatures applied before the particles are encased in the matrix.

In one example, according to various embodiments, the modified internal barrier layer capacitor material includes two phases of Calcium Copper Titanium oxides: Calcium Copper Titanate (CCTO): $CaCu_3Ti_4O_{12}$ and Calcium Tricopper Tetratita (CTT): $CaCu_3O_{12}Ti_{14}$ resulting in a two phase internal barrier layer capacitor material,
a first resistive material is applied to the grain boundaries of both internal barrier layer materials thereby resulting in a grain boundary composition on each; and
a second resistive material is bonded to the grain boundary composition of each internal barrier layer material thereby resulting in the modified dual phase internal barrier layer capacitor material.

In another example, according to various embodiments, the modified internal barrier layer capacitor material is comprised of ultra-thin grains that are less than 50 nm in diameter which are hereby known as Dielectrum particles.

When distributed in a matrix, these Dielectrum particles provide increased resistivity, permittivity and breakdown voltage compared to other dielectric particles in a matrix.

In another example, according to various embodiments, the modified internal barrier layer capacitor material includes the unmodified internal barrier layer capacitor material which is based on Calcium Copper Titanate (CCTO);
the first resistive material is Aluminum Oxide ($Al_2O_3$) resulting in $CCTO/CuAl_2O_4$ as the grain boundary composition; and
the second resistive material is Silicon Dioxide ($SiO_2$) resulting in $CCTO/CuAl_2SiO_6$ as the modified internal barrier layer capacitor material.

After calcination and or sintering of the modified internal barrier layer capacitor material there may be other phases that are include such as, but not limited to, rutile ($TiO_2$), walstromite ($CaSiO_3$), corundum ($Al_2O_3$), tenorite (CuO), copper aluminum oxide ($CuAl_2O_4$), and silicon oxide ($SiO_2$).

In one example, according to various embodiments, the additional Silicone Dioxide results in the matrix for suspension of the modified internal barrier layer capacitor material.

In another example of the modified internal barrier layer capacitor material, according to various embodiments, an unmodified internal barrier layer capacitor material is based on Calcium Copper Titanate (CCTO);
the first resistive material is 2% to 15% wt Aluminum Oxide ($Al_2O_3$) resulting in $CCTO/CuAl_2O_4$ as the grain boundary composition; and
the second resistive material is 10% to 30% wt Silicon Dioxide ($SiO_2$) resulting in $CCTO/CuAl_2SiO_6$ as the modified internal barrier layer capacitor material.

Another example includes, according to various embodiments, modified internal barrier layer capacitor material where the unmodified internal barrier layer capacitor material is a modified stoichiometry of Calcium Copper Titanium Oxide (CCTO-XS), the first resistive material is Aluminum Oxide ($Al_2O_3$), and the second resistive material is Silicon Dioxide ($SiO_2$).

Another example includes, according to various embodiments, modified internal barrier layer capacitor (IBLC) material wherein the internal barrier layer capacitor grain growth, when sintering, is inhibited by the depletion of a portion of the copper, titania and calcium from the grain boundary resulting from secondary phases of $CuAl_2O_4$, TiSiO and CaSiO.

Another example includes, according to various embodiments, modified internal barrier layer capacitor (IBLC) material wherein the primary IBLC grain growth is a result of calcination temperatures and dwell times during CCTO calcination and during the addition of the first resistive oxide through the second calcination.

Another example includes, according to various embodiments, modified internal barrier capacitor (IBLC) material wherein the IBLC particles are distributed in a matrix as illustrated in the attached TEM analysis and in FIG. 6.

Another example includes, according to various embodiments, modified internal barrier layer capacitor material wherein the modified internal barrier layer capacitor material has increased silicon dioxide and aluminum oxide beyond the amount that bonds to the grain boundary to form a highly resistive amorphous $SiO_2$ "glassy" material with high breakdown voltage (estimated at 15 Mv/cm) in between the grain boundaries and bonds between the glassy material and the grain boundary composition.

An example includes, according to various embodiments, modified internal barrier layer capacitor material comprising:
an unmodified internal barrier layer capacitor material as a base;
two or more resistive materials added individually and sequentially that are bonded to grain boundaries of the unmodified internal barrier layer capacitor material thereby resulting in a grain boundary composition.

Another example includes, according to various embodiments, modified internal barrier layer capacitor material wherein the modified internal barrier layer capacitor material has:
a dielectric permittivity of at least 50,000;
a resistivity of at least $10^{12}$ ohms/centimeter; and
a dielectric strength of at least 100 volts per micron of thickness.

Another example includes, according to various embodiments, modified internal barrier capacitor material wherein two or more of the modified internal barrier layer capacitor materials are combined to form a Dielectric Energy Storage Material (DESM)

Another example includes, according to various embodiments, Dielectric Energy Storage Material wherein two or more of the modified internal barrier layer capacitor materials are of different types.

Another example includes, according to various embodiments, Dielectric Energy Storage Material wherein two or more of the modified internal barrier layer capacitor materials are of different sizes.

Another example includes, according to various embodiments, Dielectric Energy Storage Material (DESM) comprising a first modified internal barrier layer capacitor material surrounded by a second modified internal barrier layer capacitor material so that the DESM has a core shell configuration.

Another example includes, according to various embodiments, Dielectric Energy Storage Material (DESM) comprising a first modified internal barrier layer capacitor material applied as a dielectric energy storage layer in a multilayer ceramic capacitor resulting in an energy storage device.

Another example includes, according to various embodiments, Dielectric Energy Storage Material (DESM) comprising a first modified internal barrier layer capacitor material applied as a dielectric material in a multilayer ceramic capacitor.

Another example includes, according to various embodiments, modified internal barrier layer capacitor material wherein a dispersant selected from a group including nonionic surfactants, anionic surfactants, cationic surfactants, acrylic polymers, and random, block, and graft co-polymers, is applied to the modified internal barrier layer capacitor material resulting in a nano ink for inkjet and spray deposition systems Another example includes, according to various embodiments, modified internal barrier layer capacitor material wherein one or more solvents selected from a group including water, alcohol, ethanol, methanol, ethylene glycol, glycerol, tetradecane, toluene, and xylene, and one or more binders selected from a group including epoxy resins, acrylic resins, polyurethanes, polyester resins, UV activated polymers and polyvinyl, are applied to the modified internal barrier layer capacitor material resulting in a slurry for tape cast systems.

An example modified internal barrier layer capacitor material, according to various embodiments, is synthesized according to a controlled sequential chemistry process which synthesizes the internal barrier layer capacitor material and applies two or more resistive materials in a specified sequence where one resistive material forms an outer shell surrounding each of the grains of the internal barrier layer capacitor (IBLC) material that when sintered becomes a Dielectric Energy Storage Material enabling energy storage, energy storage retention, high internal resistivity, and high breakdown voltage.

Another example Dielectric Energy Storage Material (DESM), according to various embodiments, includes an internal barrier layer capacitor (IBLC) material which is synthesized using a Sol-Gel, solid state reaction, or Wet Sol-Gel processes, and applying multistage controlled chemistry to add two or more oxides to the IBLC material.

Another example Dielectric Energy Storage Material (DESM), according to various embodiments, includes an internal barrier layer capacitor base material which is fabricated using a Wet Sol-Gel process, for example a solution of the calcium, copper and titanium oxides are mixed in a solution and form a wet gel which is heated to between 60 and 200 degrees Celsius resulting in an exothermal reaction and ultra-fine nanoparticles.

An example Wet Sol-Gel process, according to certain embodiments, includes wet gel which is heated to 130 degrees Celsius resulting in an exothermal reaction and combustion, without adding acid to cause the reaction and resulting in a barrier layer capacitor material of ultra-fine nanoparticles of less than 20 nm in diameter.

An example synthesized internal barrier layer capacitor material, according to certain embodiments, includes an internal barrier layer capacitor material which is calcined at a temperature below 900 C for less than 10 hours forming nanoparticles of less than 50 nm.

An example Dielectric Energy Storage Material, according to various embodiments, includes a DESM which is comprised of an internal barrier capacitor (IBLC) material that is synthesized by controlled grain growth when sintered through the use of a resistive material that forms an oxide shell that is integrated with the IBLC grain boundary which isolates the individual particles and inhibits grain growth.

An example Dielectric Energy Storage Material includes, according to various embodiments, IBLC particles (also referred to herein as grains) which are sintered and distributed in a matrix that is formed from an oxide shell surrounding the IBLC grains, where the oxide matrix is integrated into the IBLC grain boundary.

An example Dielectric Energy Storage Material includes, according to various embodiments, a DESM which is comprised of an internal barrier layer capacitor (IBLC) material with controlled grain size using calcination temperatures and dwell times during CCTO calcination to create the grain size.

An example Dielectric Energy Storage Material includes, according to various embodiments, a modified internal barrier layer capacitor material which is applied as a dielectric material in between electrodes in a multilayer ceramic capacitor design to create an energy storage element.

Example deposition methods for a new compound material which is described herein include inkjet printing, spray deposition, tape cast methods, screen print, spin coat, and any other conventional deposition process.

Example fabrication methods of devices using the new Dielectric Energy Storage Material (DESM) include inkjet printing, spray deposition, tape cast methods, screen print, spin coat, and any other fabrication method used to deposit nanoparticle material.

An example fabrication method includes, according to various embodiments, a DESM which is formed into an ink or slurry that includes at least one dispersant selected from a group including nonionic surfactants, anionic surfactants, cationic surfactants, acrylic polymers, random, block, and graft copolymers thereof.

An example fabrication method includes a DESM which is formed into an ink or slurry that includes one or more solvents selected from, but not limited to, a group including water, alcohol, ethanol, methanol, ethylene glycol, glycerol, tetradecane, toluene, and xylene.

An example fabrication method includes a DESM which is formed into an ink or slurry that includes one or more binders selected from, but not limited to, a group including epoxy resins, acrylic resins, polyurethanes, polyester resins, UV activated polymers, and polyvinyl.

An example fabrication method includes nitrogen which is used to create a reduced oxygen atmosphere and the nitrogen merges with $SiO_2$ to form $Si_2ON_2$.

Example devices that include a new Dielectric Energy Storage Material (DESM), according to various embodiments, include electronic components, multilayer ceramic capacitors, energy storage devices, and any other device that can utilize an energy storage ceramic material.

An example system in a combined application includes, according to various embodiments, at least one energy store device using the new Dielectric Energy Storage Material (DESM) which is coupled with at least one of: one or more solar cells, one or more radioisotope power cells, a photovoltaic system, a thermal voltaic system, a movement charge system, and a manual charge system, for providing electric charge to the Dielectric Energy Storage Material.

An example system includes, according to various embodiments, at least one device utilizing the dielectric energy storage material which is designed and fabricated to power at least one of micro devices, integrated circuits, electric vehicles, unmanned aerial vehicles, electronic cigarettes, mobile computing devices, laptops, tablets, mobile phones, wireless communication devices, or mobile sensor systems.

An example system includes, according to various embodiments, at least one device utilizing the dielectric energy storage material which is designed and fabricated as an electric power grid support or to provide uninterruptible power supplies.

An example fabrication method includes a DESM which is formed into an ink or slurry that includes one or more solvents selected from a group including water, alcohol, ethanol, methanol, ethylene glycol, glycerol, tetradecane, toluene, and xylene.

An example fabrication method includes a DESM which is formed into an ink or slurry that includes one or more binders selected from a group including epoxy resins, acrylic resins, polyurethanes, polyester resins, UV activated polymers and polyvinyl.

An example fabrication method uses nitrogen to create a reduced oxygen atmosphere when sintering the DESM material and the nitrogen merges with $SiO_2$ to form $Si_2ON_2$.

An energy storage device based on a multilayer ceramic capacitor device as described above, can be described as a Dense Energy Ultra-Cell Element (DEUC Element). The DEUC Element is a building block used to create, according to various embodiments, one or more of the following:

A DEUC Cell
where one or more DEUC Elements are connected in series and/or in parallel circuit(s) to form a DEUC Cell, and A DEUC Module
where one or more DEUC Cells are combined and interconnected in series and/or in parallel circuit(s) to form a DEUC Module, and DEUC Module Array
where one or more DEUC Modules are combined and interconnected in series and/or parallel circuit(s) to form a DEUC Module Array.

The DEUC Element, DEUC Cell, DEUC Module and DEUC Module Array, according to various embodiments, can be applied to store and provide electrical power to at least one of: micro devices and integrated circuits, electric vehicles, aircraft, boats, ships, unmanned aerial, terrestrial or water vehicles, electronic cigarettes, mobile computing devices, laptops, tablets, mobile phones, wireless communication devices, and mobile sensor systems, energy storage for an electric power grid, power backup, energy storage for solar, wind, and other alternative energy generation systems, and uninterruptible power supplies.

What is claimed is:

1. A modified internal barrier layer capacitor material comprising:
    a base material comprising unmodified internal barrier capacitor material having grain boundaries;
    first and second resistive materials bonded to the grain boundaries of the base material to form modified grain boundaries of the base material, wherein the first resistive material is bonded to grain boundaries of the base unmodified internal barrier capacitor material forming a grain boundary composition which includes nanoparticles of the first resistive material added to nanoparticles of the unmodified internal barrier capacitor material, and wherein the second resistive material is bonded to grain boundaries of the grain boundary composition forming a modified internal barrier layer capacitor material which includes nanoparticles of the second resistive material added to nanoparticles of the grain boundary composition; and
    an amorphous region in between the grain boundaries of the modified internal barrier layer capacitor material, the amorphous region including nanoparticles of at least one of the first and second resistive materials; and
    wherein the base material comprises calcium copper titanium oxide; and
    wherein the calcium copper titanium oxide includes first and second phases of calcium copper titanium oxide, wherein the first phase comprises Calcium Copper Titanium Oxide ($CaCu_3Ti_4O_{12}$) and the second phase comprises Calcium Tricopper Tetratita ($CaCu_3O_{12}Ti_{14}$).

2. The modified internal barrier layer capacitor material of claim 1, wherein the first resistive material is an aluminum oxide and the second resistive material is a silicon oxide.

3. The modified internal barrier layer capacitor material of claim 1, wherein the first phase comprises Calcium Copper Titanium Oxide ($CaCu_3Ti_4O_{12}$) and the second phase is Calcium Tricopper Tetratita ($CaCu_3O_{12}Ti_{14}$).

4. The modified internal barrier layer capacitor material of claim 1, wherein the base material comprises Calcium Copper Titanium Oxide ($CaCu_3Ti_4O_{12}$), the first resistive material is aluminum oxide, and the second resistive material is silicon dioxide.

5. The modified internal barrier layer capacitor material of claim 4, wherein the internal barrier layer capacitor material comprises nanoparticles less than 100 nm in diameter.

6. The modified internal barrier layer capacitor material of claim 1, wherein the modified internal barrier layer capacitor material has:
    a dielectric permittivity of at least 50,000;
    a resistivity of at least $10^{12}$ ohms/centimeter; and
    a dielectric strength of at least 50 volts per micron of thickness.

7. A multilayer ceramic capacitor comprising:
    at least one first electrode;
    at least one second electrode; and
    a plurality of modified internal barrier layer capacitor materials of claim 1,
    wherein the at least one first electrode and the at least one second electrode are interleaved between the plurality of modified internal barrier layer capacitor materials, and
    wherein each of the plurality of modified internal barrier layer capacitor materials is less than one micron thick.

8. The multilayer ceramic capacitor of claim 7, further comprising a coating and connecting terminals of the multilayer ceramic capacitor.

* * * * *